(12) United States Patent
Berme et al.

(10) Patent No.: US 11,097,154 B1
(45) Date of Patent: Aug. 24, 2021

(54) SWING ANALYSIS SYSTEM

(71) Applicant: Bertec Corporation, Columbus, OH (US)

(72) Inventors: Necip Berme, Worthington, OH (US); Cameron Scott Hobson, Powell, OH (US); Cal Thomas Haefke, Dublin, OH (US)

(73) Assignee: Bertec Corporation, Columbus, OH (US)

( * ) Notice: Subject to any disclaimer, the term of this patent is extended or adjusted under 35 U.S.C. 154(b) by 0 days.

(21) Appl. No.: 17/067,745

(22) Filed: Oct. 11, 2020

Related U.S. Application Data

(60) Provisional application No. 62/913,995, filed on Oct. 11, 2019.

(51) Int. Cl.
| | |
|---|---|
| *A63B 24/00* | (2006.01) |
| *A63B 69/00* | (2006.01) |
| *A63B 69/36* | (2006.01) |
| *A63B 71/06* | (2006.01) |

(52) U.S. Cl.
CPC ...... *A63B 24/0003* (2013.01); *A63B 24/0062* (2013.01); *A63B 69/0002* (2013.01); *A63B 69/3667* (2013.01); *A63B 71/0622* (2013.01); *A63B 2069/0008* (2013.01); *A63B 2069/367* (2013.01); *A63B 2071/0666* (2013.01); *A63B 2071/0694* (2013.01); *A63B 2220/52* (2013.01); *A63B 2220/54* (2013.01); *A63B 2225/50* (2013.01)

(58) Field of Classification Search
CPC ............... G01L 5/16; G01L 1/22; A61B 5/00
See application file for complete search history.

(56) References Cited

U.S. PATENT DOCUMENTS

| | | | |
|---|---|---|---|
| 6,038,488 | A | 3/2000 | Barnes et al. |
| 6,113,237 | A | 9/2000 | Ober et al. |
| 6,152,564 | A | 11/2000 | Ober et al. |
| 6,295,878 | B1 | 10/2001 | Berme |
| 6,354,155 | B1 | 3/2002 | Berme |
| 6,389,883 | B1 | 5/2002 | Berme et al. |
| 6,936,016 | B2 | 8/2005 | Berme et al. |
| 8,181,541 | B2 | 5/2012 | Berme |
| 8,315,822 | B2 | 11/2012 | Berme et al. |
| 8,315,823 | B2 | 11/2012 | Berme et al. |
| D689,388 | S | 9/2013 | Berme |
| D689,389 | S | 9/2013 | Berme |
| 8,543,540 | B1 | 9/2013 | Wilson et al. |

(Continued)

*Primary Examiner* — Eugene L Kim
*Assistant Examiner* — Christopher Glenn
(74) *Attorney, Agent, or Firm* — The Law Office of Patrick F. O'Reilly III, LLC

(57) ABSTRACT

A swing analysis system is disclosed herein. The swing analysis system includes a force measurement assembly configured to receive a user; and a data processing device operatively coupled to the force measurement assembly, the data processing device is configured to receive one or more signals that are representative of forces and/or moments being applied to a top surface of the force measurement assembly by the user, and to convert the one or more signals into output forces and/or moments, the data processing device is further configured to determine one or more swing performance metrics for the user using the output forces and/or moments from the force measurement assembly.

21 Claims, 23 Drawing Sheets

(56) References Cited

U.S. PATENT DOCUMENTS

| | | |
|---|---|---|
| 8,544,347 B1 | 10/2013 | Berme |
| 8,643,669 B1 | 2/2014 | Wilson et al. |
| 8,700,569 B1 | 4/2014 | Wilson et al. |
| 8,704,855 B1 | 4/2014 | Berme et al. |
| 8,764,532 B1 | 7/2014 | Berme |
| 8,847,989 B1 | 9/2014 | Berme et al. |
| D715,669 S | 10/2014 | Berme |
| 8,902,249 B1 | 12/2014 | Wilson et al. |
| 8,915,149 B1 | 12/2014 | Berme |
| 9,032,817 B2 | 5/2015 | Berme et al. |
| 9,043,278 B1 | 5/2015 | Wilson et al. |
| 9,066,667 B1 | 6/2015 | Berme et al. |
| 9,081,436 B1 | 7/2015 | Berme et al. |
| 9,168,420 B1 | 10/2015 | Berme et al. |
| 9,173,596 B1 | 11/2015 | Berme et al. |
| 9,200,897 B1 * | 12/2015 | Wilson ................. G06T 11/206 |
| 9,277,857 B1 | 3/2016 | Berme et al. |
| D755,067 S | 5/2016 | Berme et al. |
| 9,404,823 B1 * | 8/2016 | Berme ................. G01L 5/1627 |
| 9,414,784 B1 | 8/2016 | Berme et al. |
| 9,468,370 B1 | 10/2016 | Shearer |
| 9,517,008 B1 | 12/2016 | Berme et al. |
| 9,526,443 B1 | 12/2016 | Berme et al. |
| 9,526,451 B1 * | 12/2016 | Berme ............... A63B 24/0062 |
| 9,558,399 B1 | 1/2017 | Jeka et al. |
| 9,568,382 B1 | 2/2017 | Berme et al. |
| 9,622,686 B1 | 4/2017 | Berme et al. |
| 9,763,604 B1 | 9/2017 | Berme et al. |
| 9,770,203 B1 | 9/2017 | Berme et al. |
| 9,778,119 B2 | 10/2017 | Berme et al. |
| 9,814,430 B1 | 11/2017 | Berme et al. |
| 9,829,311 B1 * | 11/2017 | Wilson ................. G01L 1/2231 |
| 9,854,997 B1 | 1/2018 | Berme et al. |
| 9,916,011 B1 | 3/2018 | Berme et al. |
| 9,927,312 B1 | 3/2018 | Berme et al. |
| 10,010,248 B1 | 7/2018 | Shearer |
| 10,010,286 B1 | 7/2018 | Berme et al. |
| 10,085,676 B1 | 10/2018 | Berme et al. |
| 10,117,602 B1 | 11/2018 | Berme et al. |
| 10,126,186 B2 | 11/2018 | Berme et al. |
| 10,216,262 B1 | 2/2019 | Berme et al. |
| 10,231,662 B1 | 3/2019 | Berme et al. |
| 10,264,964 B1 | 4/2019 | Berme et al. |
| 10,331,324 B1 | 6/2019 | Wilson et al. |
| 10,342,473 B1 | 7/2019 | Berme et al. |
| 10,390,736 B1 | 8/2019 | Berme et al. |
| 10,413,230 B1 | 9/2019 | Berme et al. |
| 10,463,250 B1 | 11/2019 | Berme et al. |
| 10,527,508 B2 | 1/2020 | Berme et al. |
| 10,555,688 B1 | 2/2020 | Berme et al. |
| 10,646,153 B1 | 5/2020 | Berme et al. |
| 10,722,114 B1 | 7/2020 | Berme et al. |
| 10,736,545 B1 | 8/2020 | Berme et al. |
| 10,765,936 B2 | 9/2020 | Berme et al. |
| 10,803,990 B1 | 10/2020 | Wilson et al. |
| 2003/0216656 A1 * | 11/2003 | Berme ................. A61B 5/1101 600/509 |
| 2008/0221487 A1 * | 9/2008 | Zohar ................... A61B 5/224 600/595 |
| 2008/0228110 A1 * | 9/2008 | Berme ............. A63B 21/00196 600/595 |
| 2009/0029793 A1 * | 1/2009 | Cage ...................... A63B 53/04 473/324 |
| 2011/0184225 A1 * | 7/2011 | Whitall ............. A63B 24/0003 600/28 |
| 2011/0277562 A1 | 11/2011 | Berme |
| 2012/0266648 A1 * | 10/2012 | Berme ................. G01L 5/1627 73/1.08 |
| 2012/0271565 A1 * | 10/2012 | Berme ..................... G01L 5/16 702/41 |
| 2015/0096387 A1 | 4/2015 | Berme et al. |
| 2016/0245711 A1 | 8/2016 | Berme et al. |
| 2016/0334288 A1 * | 11/2016 | Berme ................. G01L 5/1627 |
| 2018/0024015 A1 | 1/2018 | Berme et al. |
| 2019/0078951 A1 * | 3/2019 | Berme ................. G01L 1/2281 |
| 2020/0139229 A1 | 5/2020 | Berme et al. |

* cited by examiner

SWING ANALYSIS SYSTEM

CROSS-REFERENCE TO RELATED APPLICATIONS

This patent application claims priority to, and incorporates by reference in its entirety, U.S. Provisional Patent Application No. 62/913,995, entitled "Swing Analysis System", filed on Oct. 11, 2019.

STATEMENT REGARDING FEDERALLY SPONSORED RESEARCH OR DEVELOPMENT

Not Applicable.

NAMES OF THE PARTIES TO A JOINT RESEARCH AGREEMENT

Not Applicable.

INCORPORATION BY REFERENCE OF MATERIAL SUBMITTED ON A COMPACT DISK

Not Applicable.

BACKGROUND OF THE INVENTION

1. Field of the Invention

The invention generally relates to a swing analysis system for improving athletic performance. More particularly, the invention relates to a swing analysis system for improving the athletic performance of an athlete that engages in a swinging motion during the execution of the sport, such as the swinging of a baseball bat or a golf club.

2. Background

Training for a sporting activity usually requires going through the same motion repeatedly. Typically, a coach or trainer first tells the athlete what to do, and then observes the motion and corrects mistakes. Particularly, in movements performed quickly, the coach or trainer explains the mistakes after the trainee performs the activity. This may take the form of showing a video of the trainee performing the activity, and then pointing out the errors. Seeing the mistakes after the fact is not as effective as getting quantitative feedback while performing the activity. This type of feedback is particularly important for sports that involve the swinging of a particular implement, such as a baseball bat or golf club.

What is needed, therefore, is a swing analysis system that is capable of determining swing performance metrics from output data of a force measurement assembly. Moreover, a swing analysis system is needed that is capable of autodetecting one or more swing phases of a user. Furthermore, a need exists for a swing analysis system that is capable of generating a swing analysis report that includes one or more swing performance metrics.

BRIEF SUMMARY OF EMBODIMENTS OF THE INVENTION

Accordingly, the present invention is directed to a swing analysis system that substantially obviates one or more problems resulting from the limitations and deficiencies of the related art.

In accordance with one or more embodiments of the present invention, there is provided a swing analysis system that comprises a force measurement assembly configured to receive a user, the force measurement assembly including a top surface for receiving at least one portion of the body of the user; and at least one force transducer, the at least one force transducer configured to sense one or more measured quantities and output one or more signals that are representative of forces and/or moments being applied to the top surface of the force measurement assembly by the user; and a data processing device operatively coupled to the force measurement assembly, the data processing device configured to receive the one or more signals that are representative of the forces and/or moments being applied to the top surface of the force measurement assembly by the user, and to convert the one or more signals into output forces and/or moments, the data processing device further configured to determine one or more swing performance metrics for the user using the output forces and/or moments from the force measurement assembly.

In a further embodiment of the present invention, the output forces and/or moments determined by the data processing device include vertical force ($F_z$) values; the one or more swing performance metrics determined by the data processing device comprise a peak load force and a peak drive force; and the data processing device determines the peak load force from a load phase of an $F_z$ force curve generated from the vertical force values, and the data processing device determines the peak drive force from a drive phase of the $F_z$ force curve.

In yet a further embodiment, the output forces and/or moments determined by the data processing device include shear force ($F_x$) values; the one or more swing performance metrics determined by the data processing device comprise a peak acceleration force and a peak braking force; and the data processing device determines the peak acceleration force from an acceleration phase of an $F_x$ force curve generated from the shear force values, and the data processing device determines the peak braking force from a braking phase of the $F_x$ force curve.

In still a further embodiment, the output forces and/or moments determined by the data processing device include shear force ($F_x$) values; the one or more swing performance metrics determined by the data processing device comprise an impulse efficiency ratio and a force efficiency ratio; and the data processing device determines the impulse efficiency ratio as a function of a braking impulse and an acceleration impulse from an $F_x$ force curve generated from the shear force values, and the data processing device determines the force efficiency ratio as a function of a braking force and an acceleration force from the $F_x$ force curve.

In yet a further embodiment, the output forces and/or moments determined by the data processing device include swing torque values generated during a swing of the user; the one or more swing performance metrics determined by the data processing device comprise a peak rotational acceleration torque and a peak rotational braking torque; and the data processing device determines the peak rotational acceleration torque from a rotational acceleration phase of a swing torque curve generated from the swing torque values, and the data processing device determines the peak rotational braking torque from a rotational braking phase of the swing torque curve.

In still a further embodiment, the output forces and/or moments determined by the data processing device include shear force ($F_x$) values and vertical force ($F_z$) values; the one or more swing performance metrics determined by the data processing device comprise a rate of force development along the x-axis and a rate of force development along the z-axis; and the data processing device determines the rate of force development along the x-axis from an $F_x$ force curve generated from the shear force values, and the data processing device determines the rate of force development along the z-axis from an $F_z$ force curve generated from the vertical force values.

In yet a further embodiment, the output forces and/or moments determined by the data processing device include shear force ($F_x$) values and vertical force ($F_z$) values; the one or more swing performance metrics determined by the data processing device comprise a vertical to horizontal brake ratio; and the data processing device determines the vertical to horizontal brake ratio by computing a ratio of a peak braking force from a braking phase of an $F_x$ force curve generated from the shear force values to a peak driving force from a driving phase of an $F_z$ force curve generated from the vertical force values.

In still a further embodiment, the output forces and/or moments determined by the data processing device include vertical force ($F_z$) values; the one or more swing performance metrics determined by the data processing device comprise a load quality of a load phase of an $F_z$ force curve generated from the vertical force values; and the data processing device determines the load quality as a function of a standard deviation taken from a beginning to an end of the load phase of the $F_z$ force curve.

In yet a further embodiment, the output forces and/or moments determined by the data processing device include shear force ($F_x$) values; the one or more swing performance metrics determined by the data processing device comprise a load variability along a portion of an $F_x$ force curve generated from the shear force values; and the data processing device determines the load variability as a function of a standard deviation taken along the portion of the $F_x$ force curve.

In still a further embodiment, the one or more swing performance metrics determined by the data processing device comprise one or more of the following swing phases for a baseball player: (i) stance, (ii) stride, (iii) coiling, (iv) swing initiation, (v) swing acceleration, and (vi) follow through; and at least one of the swing phases for the baseball player is autodetected by the data processing device of the swing analysis system.

In yet a further embodiment, the output forces and/or moments determined by the data processing device include shear force ($F_x$) values; the one or more swing performance metrics determined by the data processing device comprise an acceleration impulse and a deceleration impulse; and the data processing device determines the acceleration impulse from an acceleration phase of an $F_x$ force curve generated from the shear force values, and the data processing device determines the deceleration impulse from a braking phase of the $F_x$ force curve.

In still a further embodiment, the output forces and/or moments determined by the data processing device include vertical force ($F_z$) values; the one or more swing performance metrics determined by the data processing device comprise a load impulse and a drive impulse; and the data processing device determines the load impulse from a load phase of an $F_z$ force curve generated from the vertical force values, and the data processing device determines the drive impulse from a drive phase of the $F_z$ force curve.

In yet a further embodiment, the output forces and/or moments determined by the data processing device include shear force ($F_x$) values and vertical force ($F_z$) values; and the one or more swing performance metrics determined by the data processing device are selected from the group consisting of: (i) a maximum $F_z$ drive force, (ii) a maximum $F_z$ load force, (iii) a maximum $F_x$ acceleration force, (iv) a maximum $F_x$ braking or deceleration force, (v) a rate of force development along the x-axis, (vi) a rate of force development along the z-axis, (vii) load quality, (viii) load variability, (ix) a drive impulse, (x) a load impulse, (xi) an acceleration impulse, (xii) a braking impulse, and (xiii) combinations thereof.

In still a further embodiment, the force measurement assembly is in the form of an instrumented treadmill, force plate, or a balance plate.

In yet a further embodiment, the force measurement assembly comprises a front force plate and a rear force plate.

In still a further embodiment, the one or more swing performance metrics determined by the data processing device comprise one or more of the following swing phases for a golfer: (i) stance, (ii) stride, (iii) coiling, (iv) swing initiation, (v) swing acceleration, and (vi) follow through; and at least one of the swing phases for the golfer is autodetected by the data processing device of the swing analysis system.

In yet a further embodiment, the output forces and/or moments determined by the data processing device include shear force ($F_x$) values; the one or more swing performance metrics determined by the data processing device comprise a backshift impulse of a golf swing; and the data processing device determines the backshift impulse of the golf swing by determining an area under an $F_x$ force curve generated from the shear force values, the area under the $F_x$ force curve being determined for a portion of the $F_x$ force curve prior to a transition point between a golf backswing to a golf downswing when the shear force values are greater than zero.

In still a further embodiment, the output forces and/or moments determined by the data processing device include swing torque ($M_z$) values generated during a golf swing of the user; the one or more swing performance metrics determined by the data processing device comprise a golf backswing rate of torque development during the golf swing; and the data processing device determines the golf backswing rate of torque development by calculating a slope of an $M_z$ swing torque curve generated from the swing torque values, the slope of the $M_z$ swing torque curve being determined between a first point where the swing torque values of the $M_z$ swing torque curve become positive and a second point proximate to a transition between a golf backswing to a golf downswing.

In yet a further embodiment, the output forces and/or moments determined by the data processing device include swing torque ($M_z$) values generated during a golf swing of the user; the one or more swing performance metrics determined by the data processing device comprise a golf downswing rate of torque development during the golf swing; and the data processing device determines the golf downswing rate of torque development by calculating a slope of an $M_z$ swing torque curve generated from the swing torque values, the slope of the $M_z$ swing torque curve being determined between a first point and a second point, the first point being the transition point between a golf backswing to a golf downswing, and the second point being a maximum swing torque value on the $M_z$ swing torque curve.

In still a further embodiment, the one or more swing performance metrics determined by the data processing device comprise a time to contact during a baseball swing, the time to contact being determined by subtracting a first time instance when a foot of the user is put back down on the ground at the end of a stride phase from an estimated time to ball contact.

It is to be understood that the foregoing summary and the following detailed description of the present invention are merely exemplary and explanatory in nature. As such, the foregoing summary and the following detailed description of the invention should not be construed to limit the scope of the appended claims in any sense.

BRIEF DESCRIPTION OF THE SEVERAL VIEWS OF THE DRAWINGS

The invention will now be described, by way of example, with reference to the accompanying drawings, in which.

Throughout the figures, the same parts are always denoted using the same reference characters so that, as a general rule, they will only be described once.

DETAILED DESCRIPTION OF EMBODIMENTS OF THE INVENTION

The present invention is described herein, in an exemplary manner, with reference to computer system architecture and exemplary processes carried out by the computer system. In one or more embodiments, the functionality described herein can be implemented by computer system instructions. These computer program instructions may be loaded directly onto an internal data storage device of a computing device (e.g., an internal data storage device of a laptop computing device). Alternatively, these computer program instructions could be stored on a portable computer-readable medium (e.g., a flash drive, etc.), and then subsequently loaded onto a computing device such that the instructions can be executed thereby. In other embodiments, these computer program instructions could be embodied in the hardware of the computing device, rather than in the software thereof. It is also possible for the computer program instructions to be embodied in a combination of both the hardware and the software.

This description describes in general form the computer program(s) required to carry out the swing analysis for a user. Any competent programmer in the field of information technology could develop a system using the description set forth herein.

For the sake of brevity, conventional computer system components, conventional data networking, and conventional software coding will not be described in detail herein. Also, it is to be understood that the connecting lines shown in the block diagram(s) included herein are intended to represent functional relationships and/or operational couplings between the various components. In addition to that which is explicitly depicted, it is to be understood that many alternative or additional functional relationships and/or physical connections may be incorporated in a practical application of the system.

Figure 2:
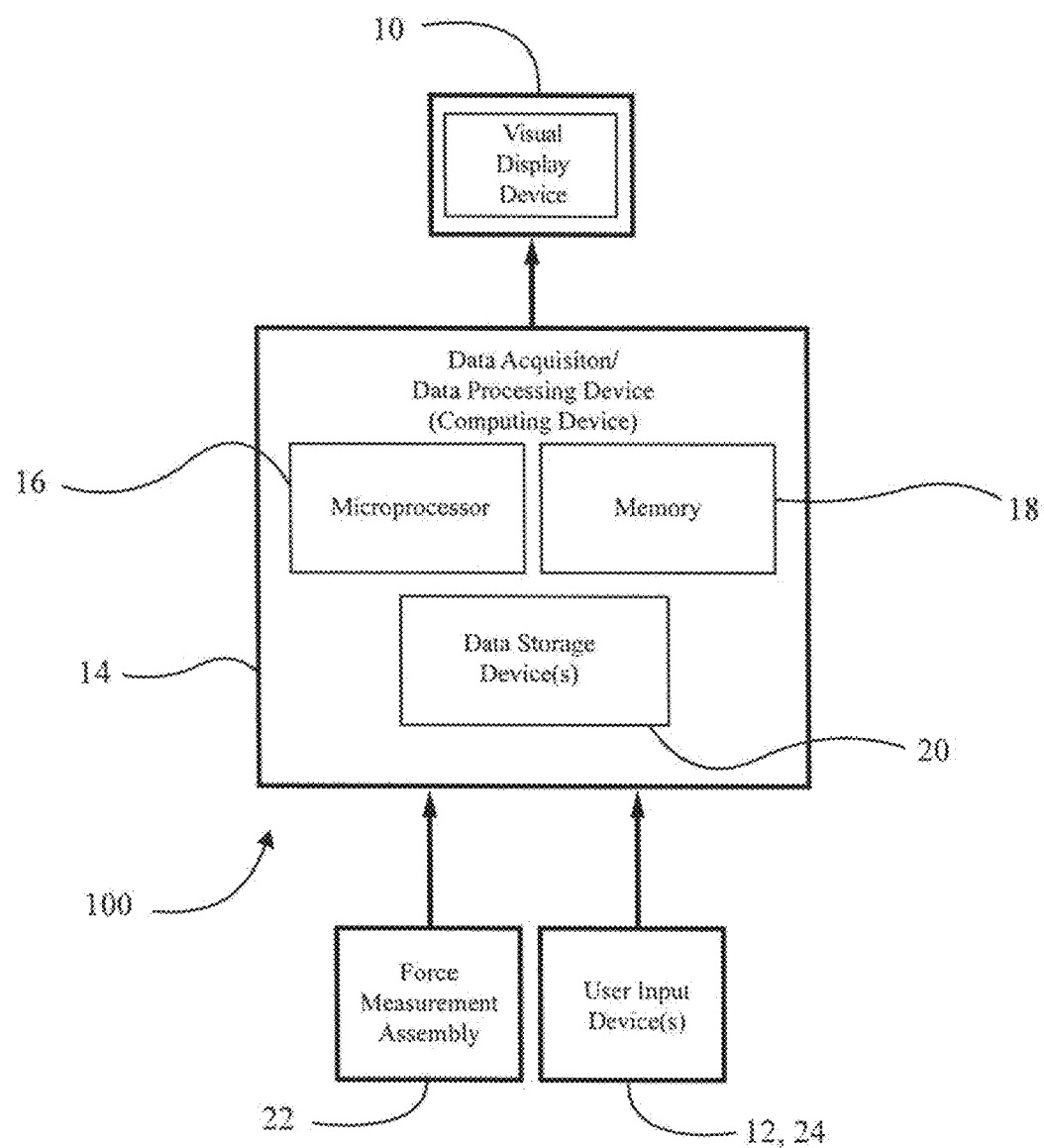
FIG. 2 is a block diagram of constituent components that may be utilized in the illustrative embodiment of the swing analysis system described herein.

An illustrative embodiment of a swing analysis system is seen generally at 100 in FIG. 2. In the illustrative embodiment, the swing analysis system 100 generally comprises a visual display device 10 and a data processing device and/or data processing and data acquisition device 14 (e.g., a computing device or a computer). In one or more embodiments, the graphs depicted in FIGS. 3-22 and described hereinafter are displayed on the output screen of the visual display device 10 so that the graphical force output data of a baseball swing is visible to a user.

As shown in the illustrative block diagram of FIG. 2, the swing analysis system 100 further includes one or more user input devices 12, 24. The user input device 12, 24 is configured to output a signal based upon an input response by a user. In the illustrative embodiment, the user input devices 12, 24 may comprise (i) a voice recognition device, (ii) a wireless remote control with one or more buttons, (iii) a mouse, (iv) a keyboard (i.e., a virtual or physical keyboard), (v) a clicking device, (vi) a joystick, (vii) a pointing device, and/or (viii) a touchscreen user interface of the visual display device 10.

Now, turning again to FIG. 2, it can be seen that the data processing device 14 (e.g., the computing device 14) of the swing analysis system 100 comprises a microprocessor 16 for processing data, memory 18 (e.g., random access memory or RAM) for storing data during the processing thereof, and data storage device(s) 20, such as one or more internal solid state drives, external flash drives, or any combination thereof. As shown in FIG. 2, the visual display device 10 is operatively coupled to the computing device 14 such that data is capable of being transferred between these devices (e.g., the visual display device 10 may be a touchscreen visual display device with a touchscreen user interface as described above). Also, as illustrated in FIG. 2, one or more data input devices 12, 24, such as the touchscreen user interface or a voice recognition sensor are operatively coupled to the computing device 14 so that a user is able to enter data into the computing device 14. In one or more alternative embodiments, the computing device 14 may be in the form of a laptop computing device or a desktop computer. Also, in one or more alternative embodiments, the visual display device 10 may be in the form of a head-mounted visual display device (e.g., a display incorporated in a pair of goggles), and the user input device 24 may be in the form of a voice recognition device or a touchpad interface.

Figure 1:
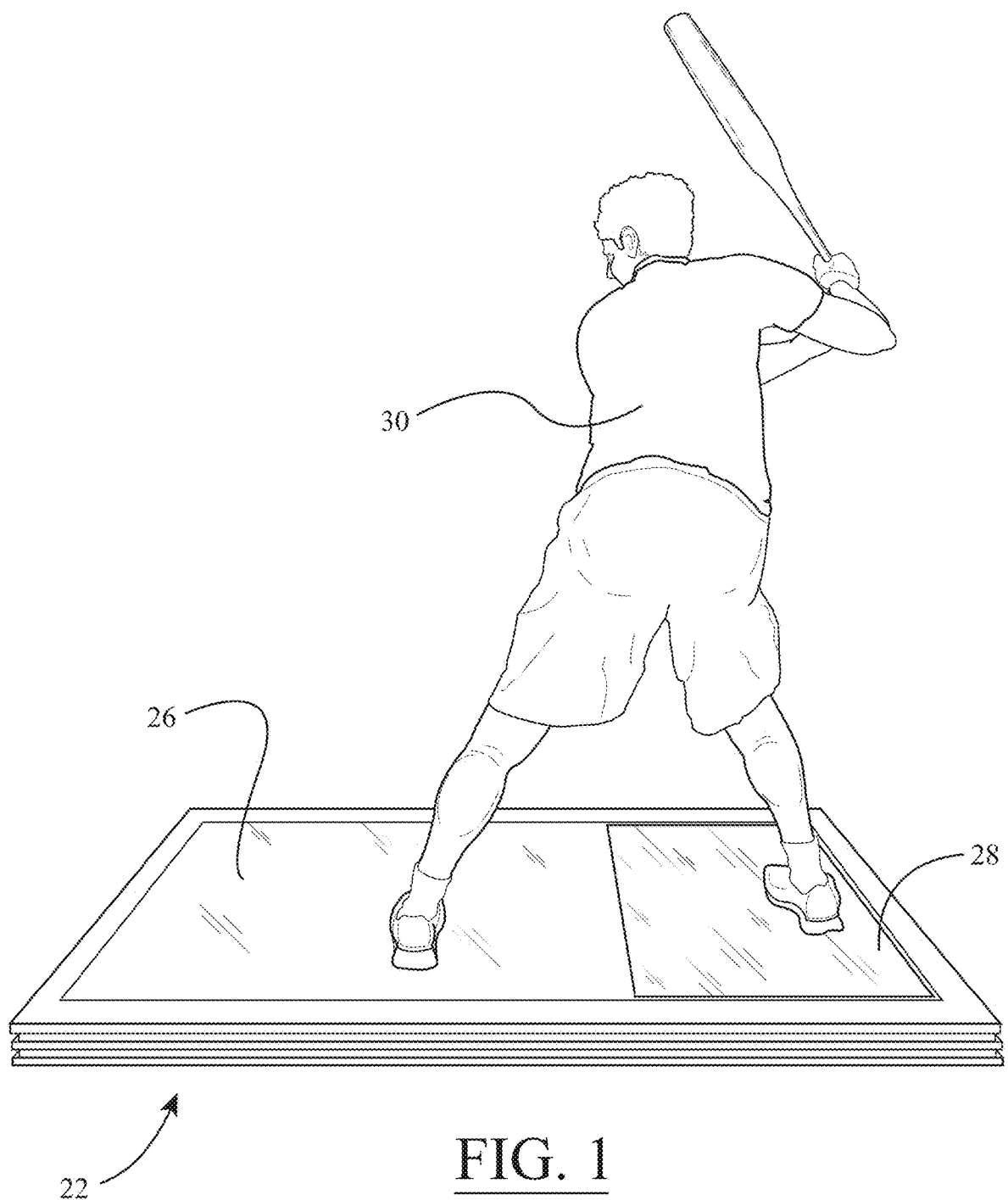
FIG. 1 is a perspective view of a baseball player disposed on a force measurement assembly of a swing analysis system, according to an illustrative embodiment of the invention.

Referring again to FIG. 2, it can be seen that the illustrative swing analysis system 100 further includes a force measurement assembly 22 for measuring the ground reaction forces and/or moments of the user. In particular, the force measurement assembly 22 may comprise static front and rear force plates 26, 28 (see FIG. 1) that are configured to rest on the floor of the room in which the system 100 is disposed for accommodating a baseball player 30 or golfer. The front and rear force plates 22 comprise a plurality of force transducers or load cells for measuring the forces and/or moments generated on the plate surfaces thereof by respective feet of the user. As such, the center of pressure (COP), center of gravity (COG), and/or sway angle of the user may be determined while the user swings a baseball bat or other sports implement on the force measurement assembly 22.

In the illustrative embodiment, the force measurement assembly 22 is operatively coupled to the data processing device 14 by virtue of an electrical cable. In one embodiment, the electrical cable is used for data transmission, as well as for providing power to the force measurement assembly 22. Various types of data transmission cables can be used for the cable. For example, the cable can be a Universal Serial Bus (USB) cable or an Ethernet cable. Preferably, the electrical cable contains a plurality of electrical wires bundled together, with at least one wire being used for power and at least another wire being used for transmitting data. The bundling of the power and data transmission wires into a single electrical cable advantageously creates a simpler and more efficient design. In addition, it enhances the safety of the training environment for the user. However, it is to be understood that the force measurement assembly 22 can be operatively coupled to the data processing device 14 using other signal transmission means, such as a wireless data transmission system. If a wireless data transmission system is employed, it is preferable to provide the force measurement assembly 22 with a separate power supply in the form of an internal power supply or a dedicated external power supply.

Now, the acquisition and processing of the load data carried out by the illustrative embodiment of the swing analysis system 100 will be described. Initially, a load is applied to the force measurement assembly 22 by the user disposed thereon. The load is transmitted from the front and rear plate components of the force measurement assembly 22 to its force transducer beams. In the illustrative embodiment, each plate component of the force measurement assembly 22 is supported on a plurality of force transducer beams disposed thereunder. In the illustrative invention, each of the force transducer beams includes a plurality of strain gages wired in one or more Wheatstone bridge configurations, wherein the electrical resistance of each strain gage is altered when the associated portion of the associated beam-type force transducer undergoes deformation (i.e., a measured quantity) resulting from the load (i.e., forces and/or moments) acting on the front and rear plate components. For each plurality of strain gages disposed on the force transducer beams, the change in the electrical resistance of the strain gages brings about a consequential change in the output voltage of the Wheatstone bridge (i.e., a quantity representative of the load being applied to the measurement surface). Thus, in the illustrative embodiment, the pair of force transducer beams disposed under the plate components output a plurality of analog output voltages (signals). In the illustrative embodiment, the plurality of output voltages from the front and rear force plates are then transmitted to a preamplifier board (not shown) for preconditioning. The preamplifier board is used to increase the magnitudes of the transducer analog voltages, and preferably, to convert the analog voltage signals into digital voltage signals as well. After which, the force measurement assembly 22 transmits the force plate output signals to a main signal amplifier/converter. Depending on whether the preamplifier board also includes an analog-to-digital (A/D) converter, the force plate output signals could be either in the form of analog signals or digital signals. The main signal amplifier/converter further magnifies the force plate output signals, and if the signals are of the analog-type (for a case where the preamplifier board did not include an analog-to-digital (A/D) converter), it may also convert the analog signals to digital signals. In the illustrative embodiment, the force plate output signals may also be transformed into output forces and/or moments by the firmware of the front and rear force plates by multiplying the voltage signals by a calibration matrix prior to the force plate output data being transmitted to the data processing device 14. Alternatively, the data acquisition/data processing device 14 may receive the voltage signals, and then transform the signals into output forces and/or moments by multiplying the voltage signals by a calibration matrix.

After the voltage signals are transformed into output forces and/or moments, the center of pressure for each foot of the user (i.e., the x and y coordinates of the point of application of the force applied to the measurement surface by each foot) may be determined by the data acquisition/data processing device 14.

In the illustrative embodiment, the data processing device 14 determines all three (3) orthogonal components of the resultant forces acting on the front and rear force plates (i.e., $F_{Fx}$, $F_{Fy}$, $F_{Fz}$, $F_{Rx}$, $F_{Ry}$, $F_{Rz}$) and all three (3) orthogonal components of the moments acting on the front and rear force plates (i.e., $M_{Fx}$, $M_{Fy}$, $M_{Fz}$, $M_{Rx}$, $M_{Ry}$, $M_{Rz}$), while in another embodiment, a subset of these force and moment components may be determined.

In the illustrative embodiment, where a single set of overall center of pressure coordinates ($x_p$, $y_p$) are determined for the force measurement assembly 22, the center of pressure of the force vector $\vec{F}$ applied by the user to the measurement surface of the force plate 22 is computed as follows:

$$x_P = \frac{-M_y}{F_Z} \quad (1)$$

$$y_P = \frac{M_x}{F_Z} \quad (2)$$

where:
$x_p$, $y_p$: coordinates of the point of application for the force (i.e., center of pressure) on the force plate assembly 22;
$F_z$: z-component of the resultant force acting on the force plate assembly 22;
$M_x$: x-component of the resultant moment acting on the force plate assembly 22; and
$M_y$: y-component of the resultant moment acting on the force plate assembly 22.

In an alternative embodiment, the center of pressure coordinates ($x_p$, $y_p$) may be determined separately for the front and rear force plates of the force measurement assembly 22.

Figure 3:
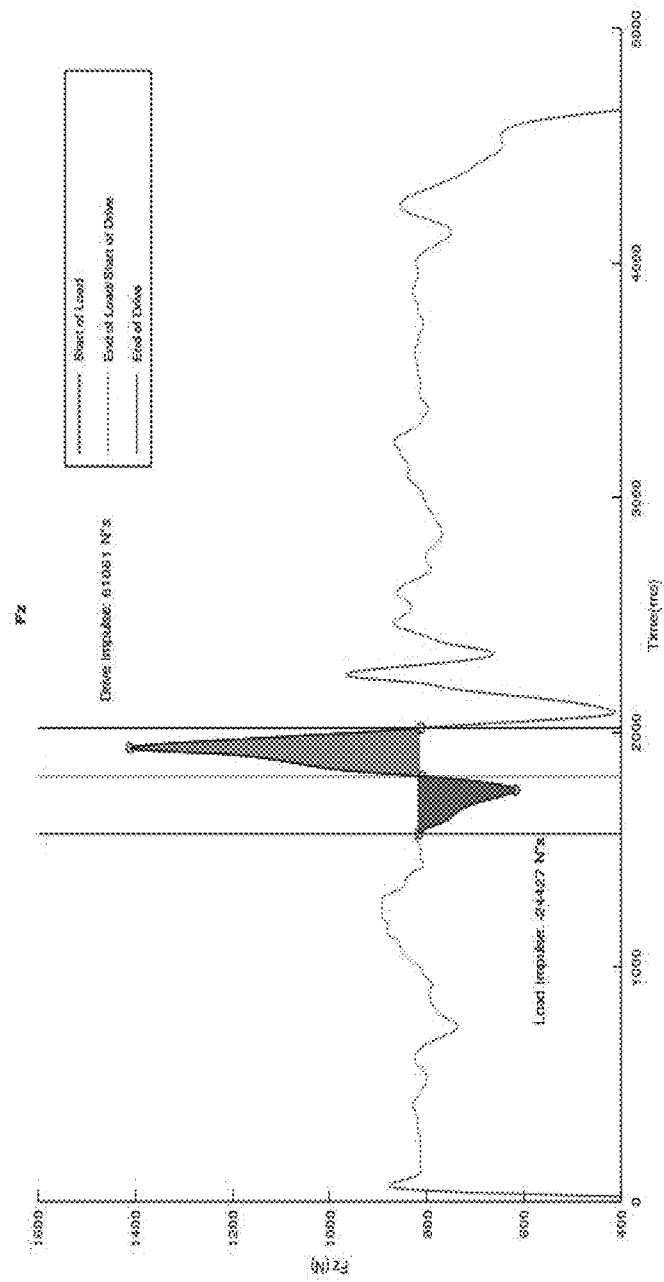
FIG. 3 is a graph illustrating a vertical force curve generated during a baseball swing where the load phase and the drive phase of the baseball swing are depicted, according to an embodiment of the invention.

In the illustrative embodiment, the data processing device 14 of the swing analysis system 100 is programmed to determine a plurality of different outputs from the force plate output data, which may include: (i) autodetection of movements (e.g., during golf, vertical jump, baseball swing phases), (ii) peak forces ($F_x$, $F_y$, and $F_z$) and torques, (iii) impulses, (iv) timing metrics, (v) timestamps of important events, and (vi) rate of force development. For example, as illustrated in the graph of FIG. 3, the data processing device 14 may be programmed to determine z-axis metrics during the load phase (i.e., the shaded minimum region in FIG. 3) and the drive phase (i.e., the shaded maximum region in FIG. 3), such as the peak $F_z$ load force and the peak $F_z$ drive force. The load phase is the countermovement while loading before swinging, while the drive phase is the maximum vertical force created before contact with the ball. Turning again to FIG. 3, the peak $F_z$ load force is the lowest point in the shaded minimum region of FIG. 3, while the peak $F_z$ drive force is the highest point in the shaded maximum region of FIG. 3.

Figure 4:
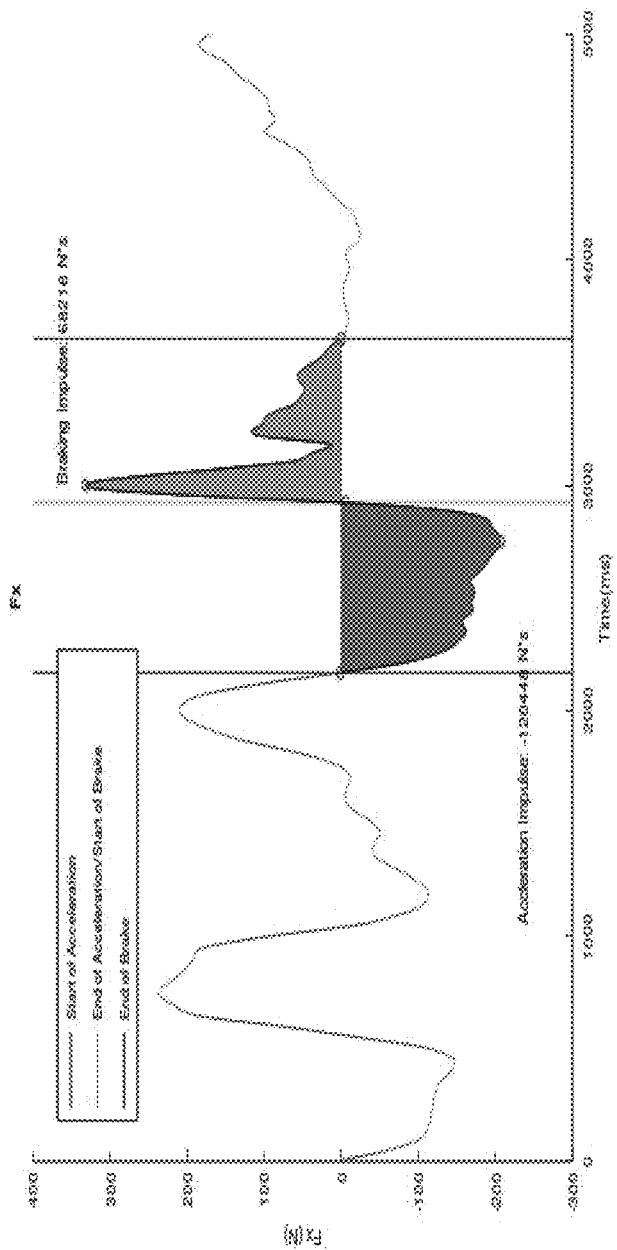
FIG. 4 is a graph illustrating an x-axis force curve generated during a baseball swing where the acceleration phase and the braking phase of the baseball swing are depicted, according to an embodiment of the invention.
Figure 5:
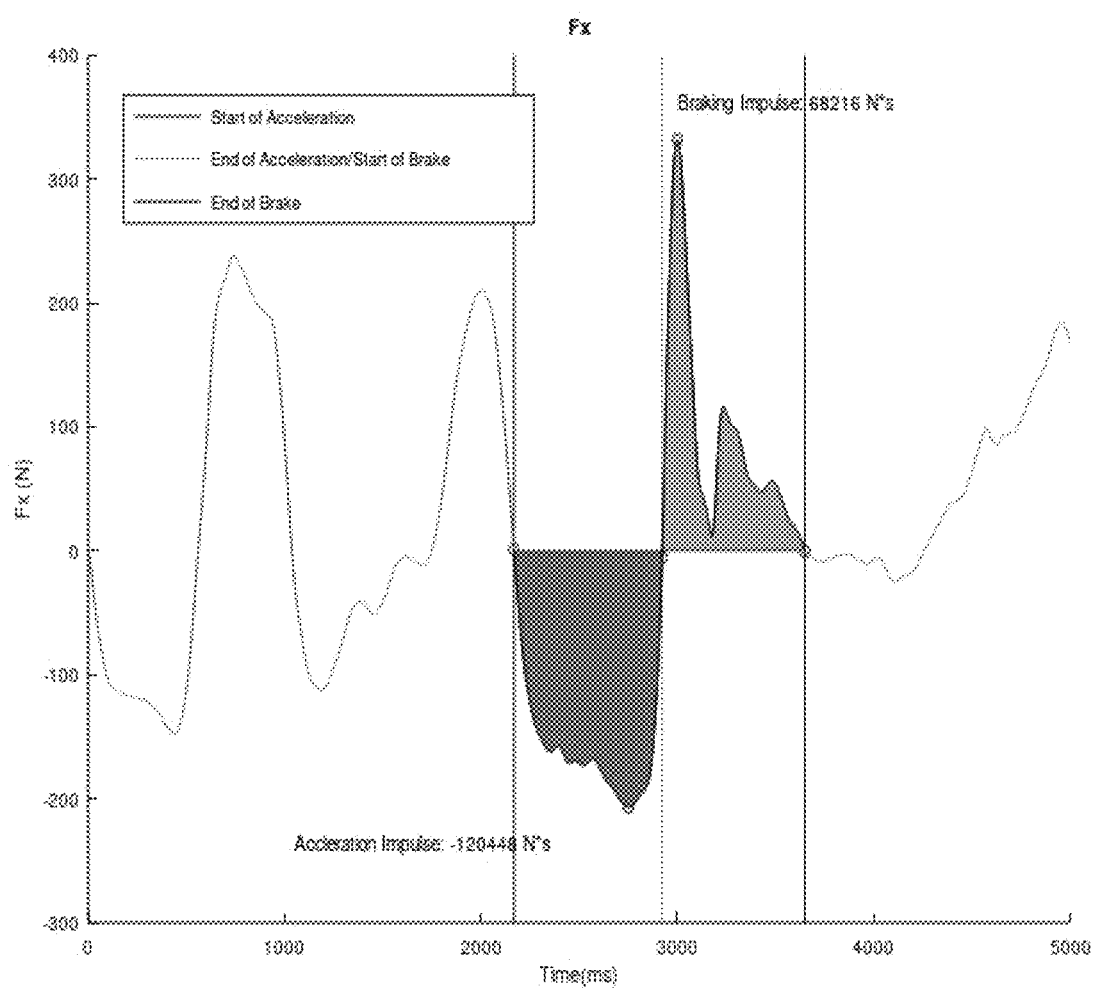
FIG. 5 is another graph illustrating an x-axis force curve generated during a baseball swing where the acceleration phase and the braking phase of the baseball swing are depicted, according to an embodiment of the invention.

Also, as illustrated in the graphs of FIGS. 4 and 5, the data processing device 14 may be programmed to determine x-axis metrics during the acceleration phase (i.e., the shaded minimum region in FIGS. 4 and 5) and the braking phase (i.e., the shaded maximum region in FIGS. 4 and 5), such as the peak $F_x$ acceleration force, the peak $F_x$ braking force, and efficiency ratios. During a baseball swing, the acceleration phase is when the baseball player is accelerating toward the pitcher, while the braking phase is when the baseball player is putting on the brakes, and applying force away from the pitcher. Turning again to FIG. 4, the peak $F_x$ acceleration force is the lowest point in the shaded minimum region of FIG. 4, while the peak $F_x$ braking force is the highest point in the shaded maximum region of FIG. 4. In the illustrative embodiment, the data processing device 14 also may be programmed to determine the efficiency ratios for the impulse and the force. For example, considering the $F_x$ force curve depicted in FIG. 5, the data processing device 14 may be programmed to compute the ratio of the braking impulse to the acceleration impulse as follows:

$$68216 N \cdot s / -120448 N \cdot s = -0.57 \quad (3)$$

As another example, considering the $F_x$ force curve depicted in FIG. 5, the data processing device 14 may be programmed to compute the ratio of the braking force to the acceleration force as follows:

$$331 N / -206 N = -1.60 \quad (4)$$

Advantageously, these efficiency ratios give insight into transfer of energy and force from the acceleration phase to the braking phase. Also, the time from the peak acceleration force to the peak braking force in the graph of FIG. 5 is indicative of how quickly the baseball player transfers from accelerating to braking movement. In FIG. 5, the time peak acceleration is at lowest point in the shaded minimum region of FIG. 5, while the time peak brake is at the highest point in the shaded maximum region of FIG. 5. As such, considering the $F_x$ force curve depicted in FIG. 5, the data processing device 14 may be programmed to compute the time from the peak acceleration force to the peak braking force as follows:

$$2.99 \text{ sec} - 2.75 \text{ sec} = 0.24 \text{ sec} \quad (5)$$

Figure 6:
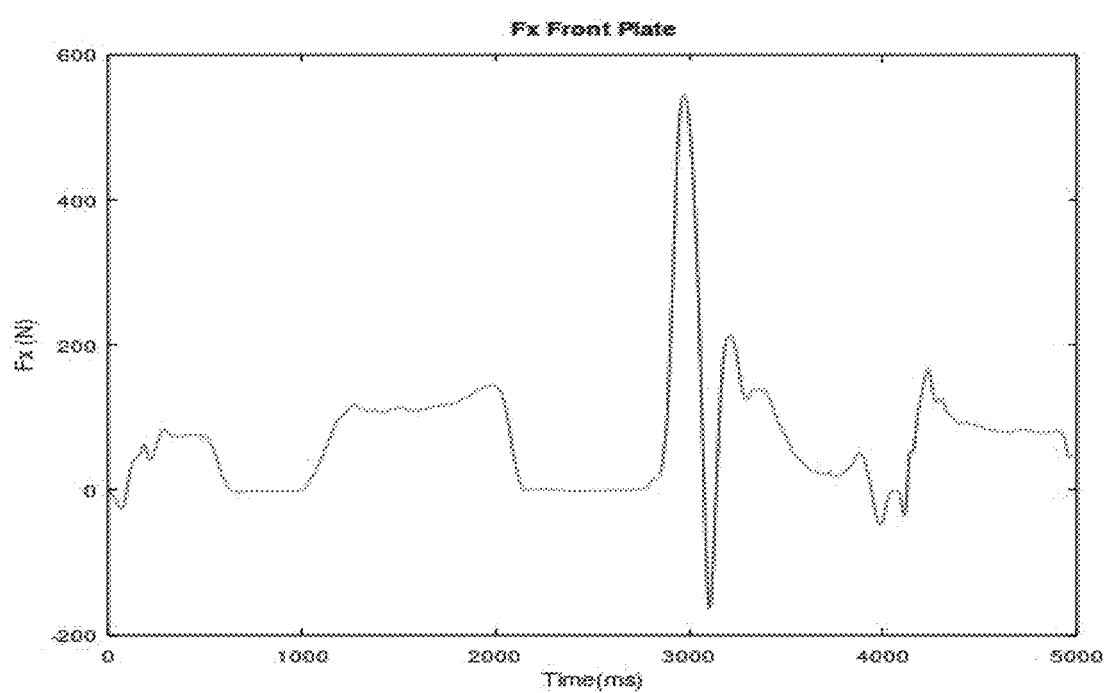
FIG. 6 is a graph illustrating an x-axis force curve generated during a baseball swing for a front force plate, according to an embodiment of the invention.
Figure 7:
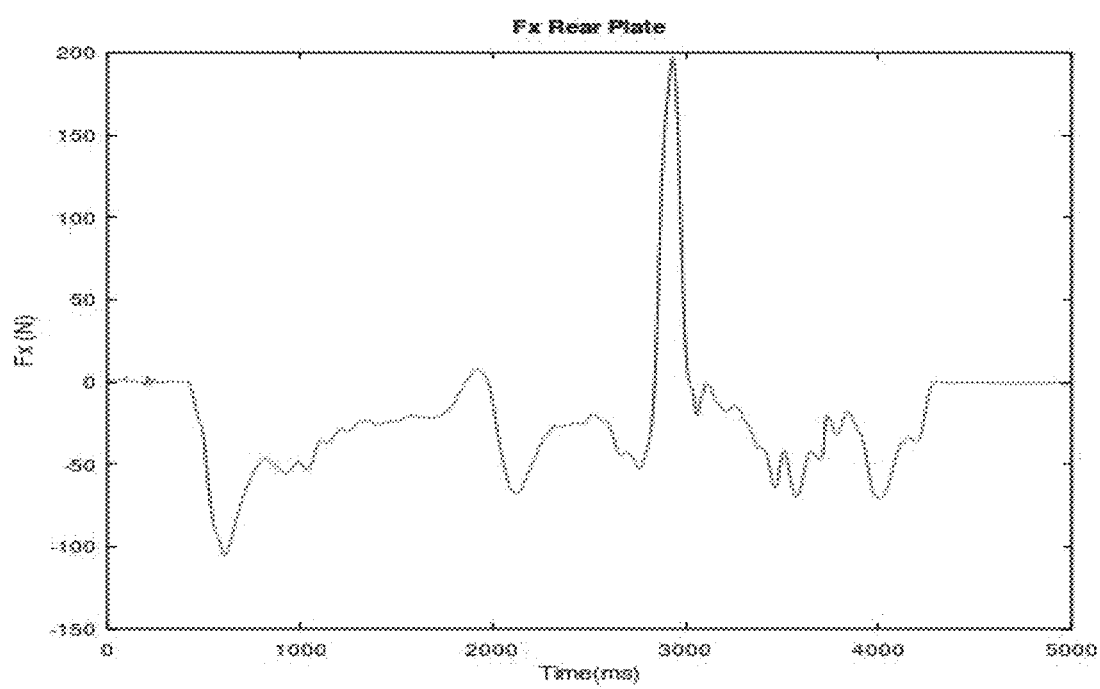
FIG. 7 is a graph illustrating an x-axis force curve generated during a baseball swing for a rear force plate, according to an embodiment of the invention.

Additional x-axis metrics determined by the data processing device 14 in the illustrative embodiment will be discussed with reference to FIGS. 6 and 7. FIG. 6 depicts the $F_x$ force curve for the front plate, while the FIG. 7 depicts the $F_x$ force curve for the rear plate. The rear plate $F_x$ force corresponding to the point in time when the front plate $F_x$ force reaches its maximum value gives insight on how much force is being left on the back side by the baseball player before contact with the ball. This rear plate force may be taken as a percentage of maximum force to give an idea of how much force is being left on the back side. For example, considering the $F_x$ force curves depicted in FIGS. 6 and 7, the data processing device 14 may be programmed to compute the ratio of the rear plate $F_x$ force at the time when the front plate Fx force reaches its maximum value to the peak rear plate $F_x$ force as follows:

$$75N/200N=37.5\% \tag{6}$$

Figure 8:
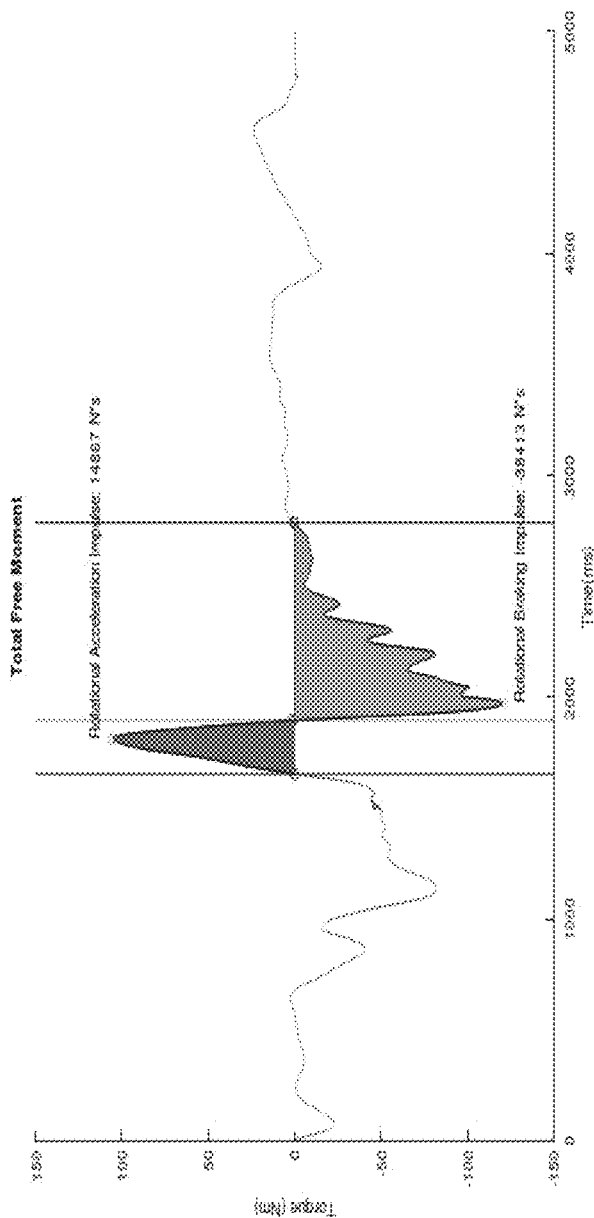
FIG. 8 is a graph illustrating a torque curve generated during a baseball swing where the rotational acceleration phase and the rotational braking phase of the baseball swing are depicted, according to an embodiment of the invention.

In addition, as illustrated in the graph of FIG. 8, the data processing device 14 may be programmed to determine torque metrics during the rotational acceleration phase (i.e., the shaded maximum region in FIG. 8) and the rotational braking phase (i.e., the shaded minimum region in FIG. 8), such as the peak rotational acceleration torque and the peak rotational braking torque. During a baseball swing, the rotational acceleration phase is when the baseball player is rotating towards the baseball, while the rotational braking phase is when the baseball player is rotating away from the baseball. During the rotational braking phase, the baseball player is trying to stop over-rotating by "applying the brakes" in the rotational sense. The torque metrics determined by the data processing device 14 also may be used to automatically determine the handedness of the baseball player. Turning again to FIG. 8, the peak rotational acceleration torque is the highest point in the shaded maximum region of FIG. 8, while the peak rotational braking torque is the lowest point in the shaded minimum region of FIG. 8. In FIG. 8, the torque on the y-axis of the graph is the moment about the center of pressure (COP).

Figure 9:
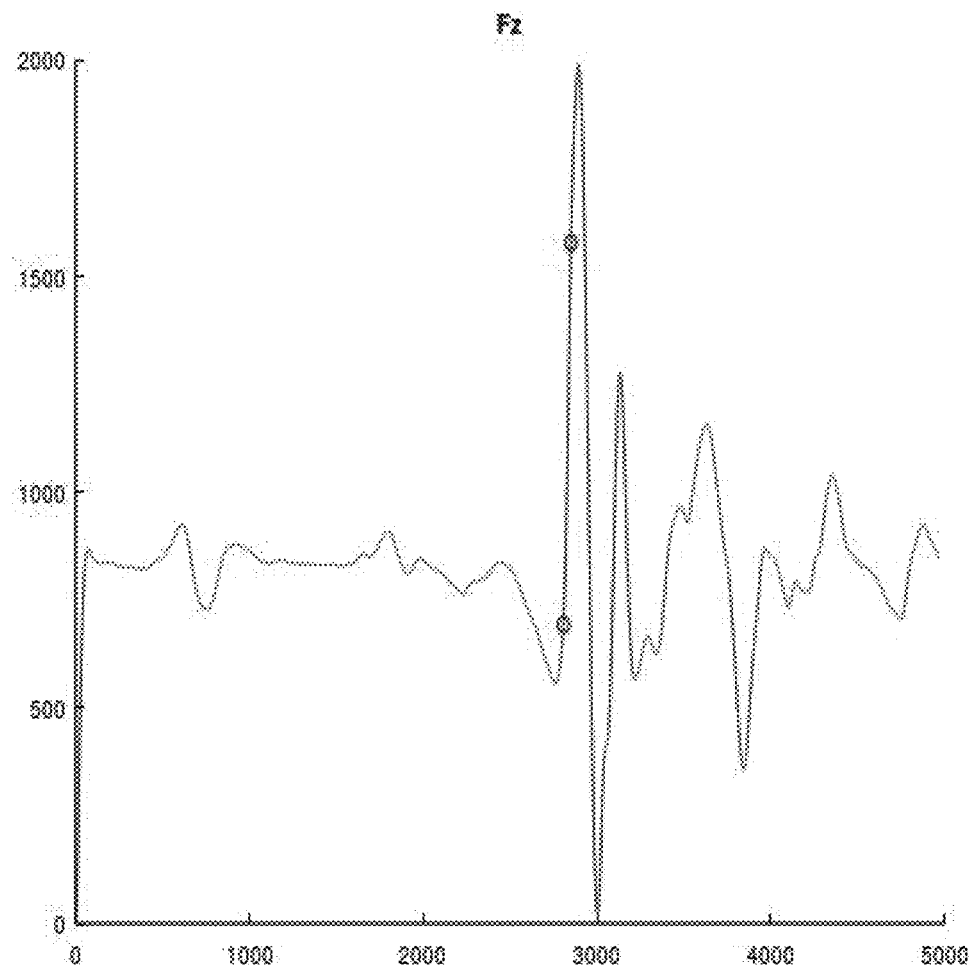
FIG. 9 is a graph illustrating a rate of force development along the z-axis, according to an embodiment of the invention.
Figure 10:
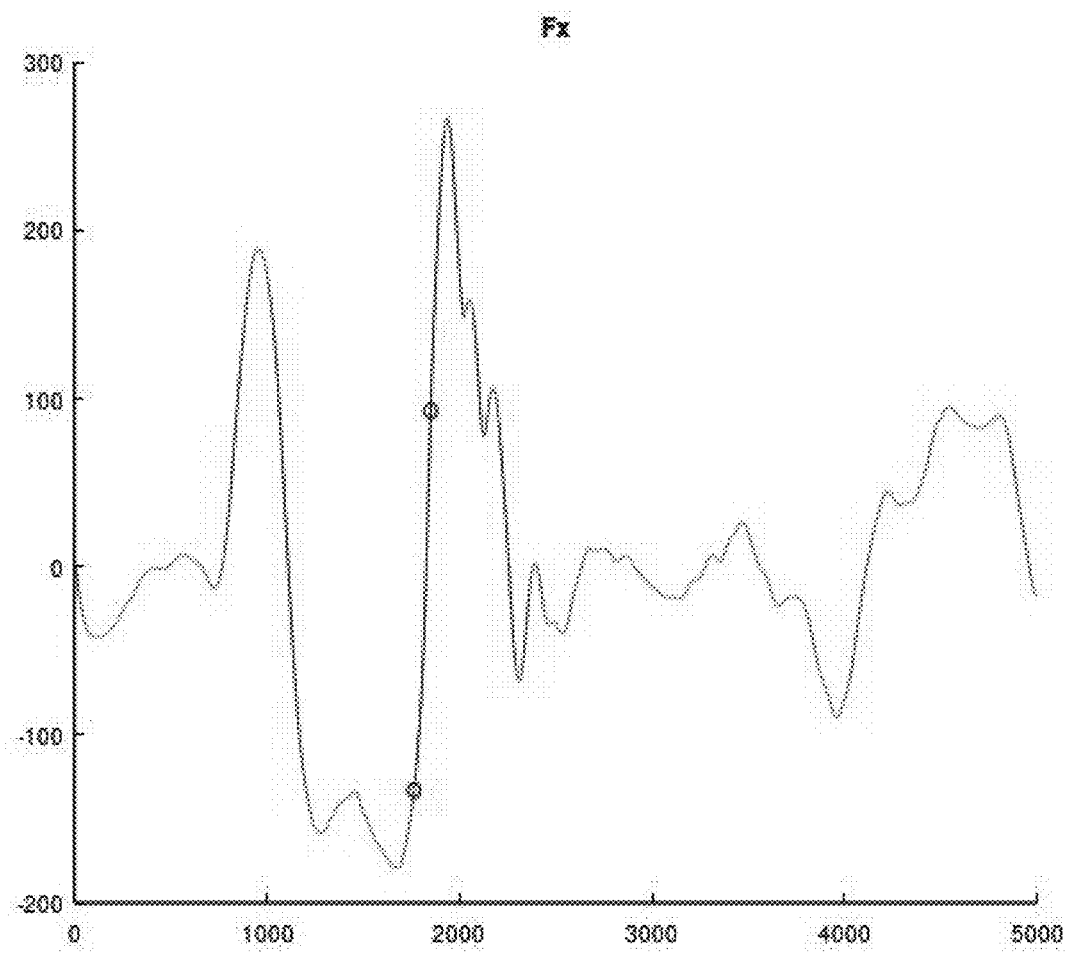
FIG. 10 is a graph illustrating a rate of force development along the x-axis, according to an embodiment of the invention.
Figure 11:
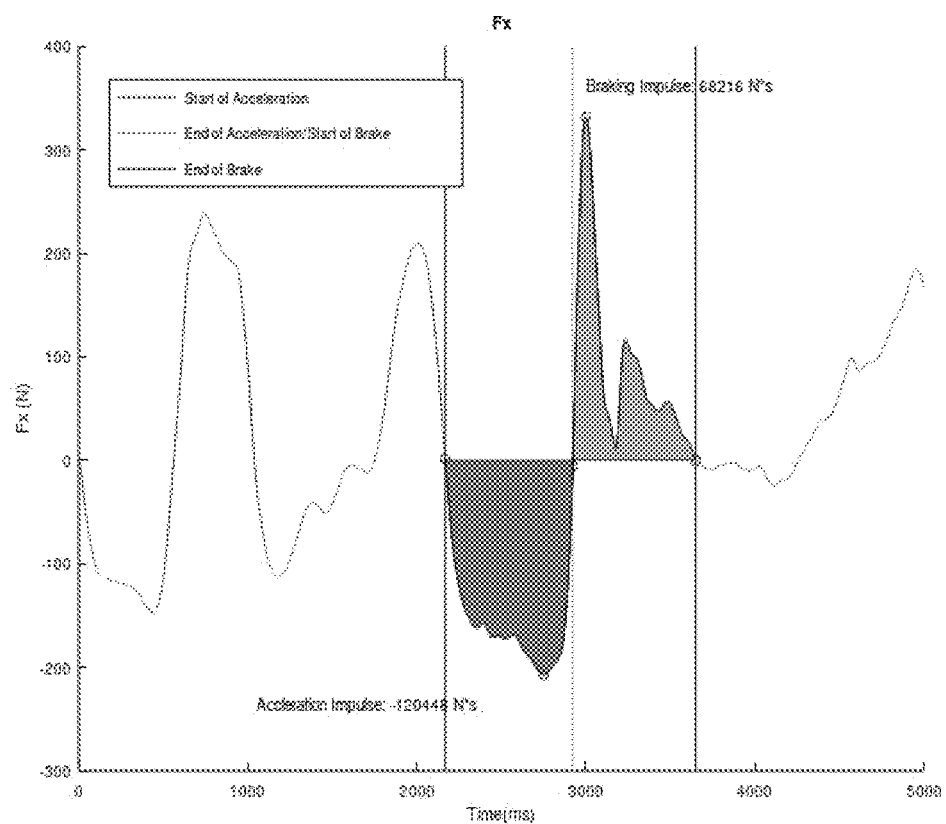
FIG. 11 is yet another graph illustrating an x-axis force curve generated during a baseball swing where the acceleration phase and the braking phase of the baseball swing are depicted, according to an embodiment of the invention.
Figure 12:
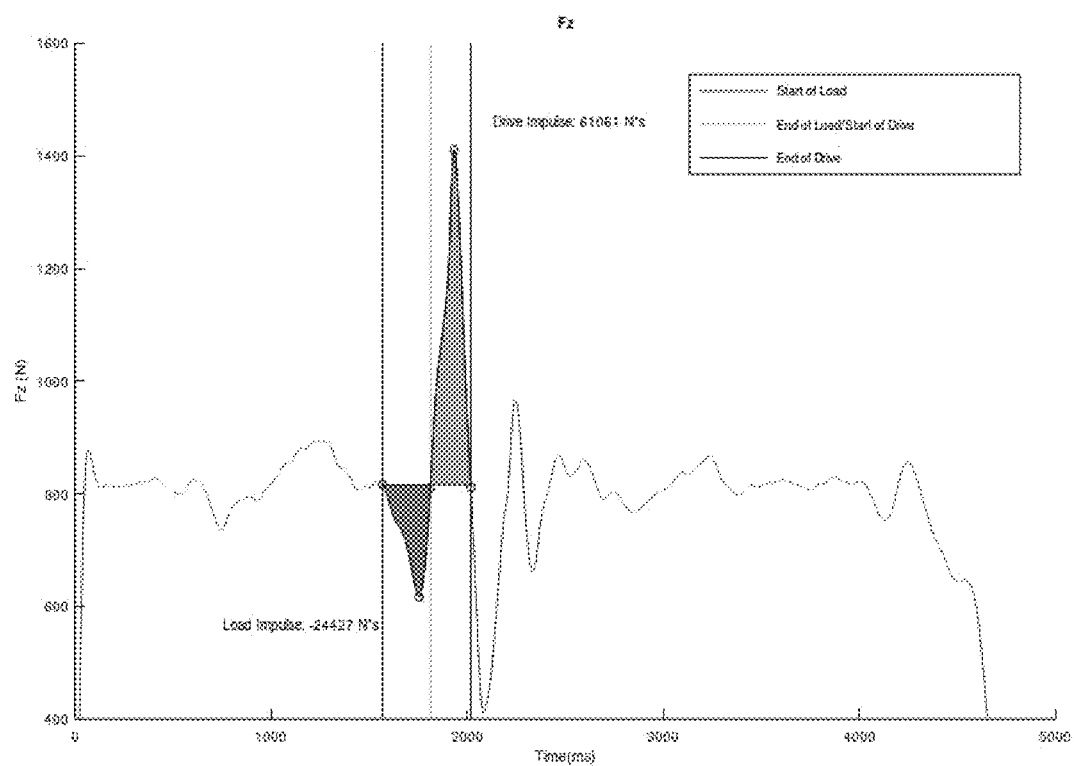
FIG. 12 is a graph illustrating a z-axis force curve generated during a baseball swing where the load phase and the driving phase of the baseball swing are depicted, according to an embodiment of the invention.

Further, with reference to FIGS. 9 and 10 respectively, the rate of force development along the z-axis and x-axis may be determined by the data processing device 14. For example, when the rate of force development is computed between the two (2) encircled points on the $F_z$ force curve in FIG. 9, the data processing device 14 determines that the rate of $F_z$ force development is 4367 N/s. As another example, when the rate of force development is computed between the two (2) encircled points on the $F_x$ force curve in FIG. 10, the data processing device 14 determines that the rate of $F_x$ force development is 1739 N/s.

In the illustrative embodiment, the data processing device 14 also may be programmed to determine the vertical/horizontal brake ratio for the baseball player. The vertical/horizontal brake ratio is the ratio of the vertical positive impulse and the horizontal negative impulse, and the vertical/horizontal brake ratio gives insight into whether more braking is happening horizontally or vertically. For example, considering the $F_x$ and $F_z$ force curves depicted in FIGS. 11 and 12, respectively, the data processing device 14 may be programmed to compute the vertical/horizontal brake ratio as follows:

$$68216 N \cdot s/61060 N \cdot s = 1.12 \tag{7}$$

Figure 13:
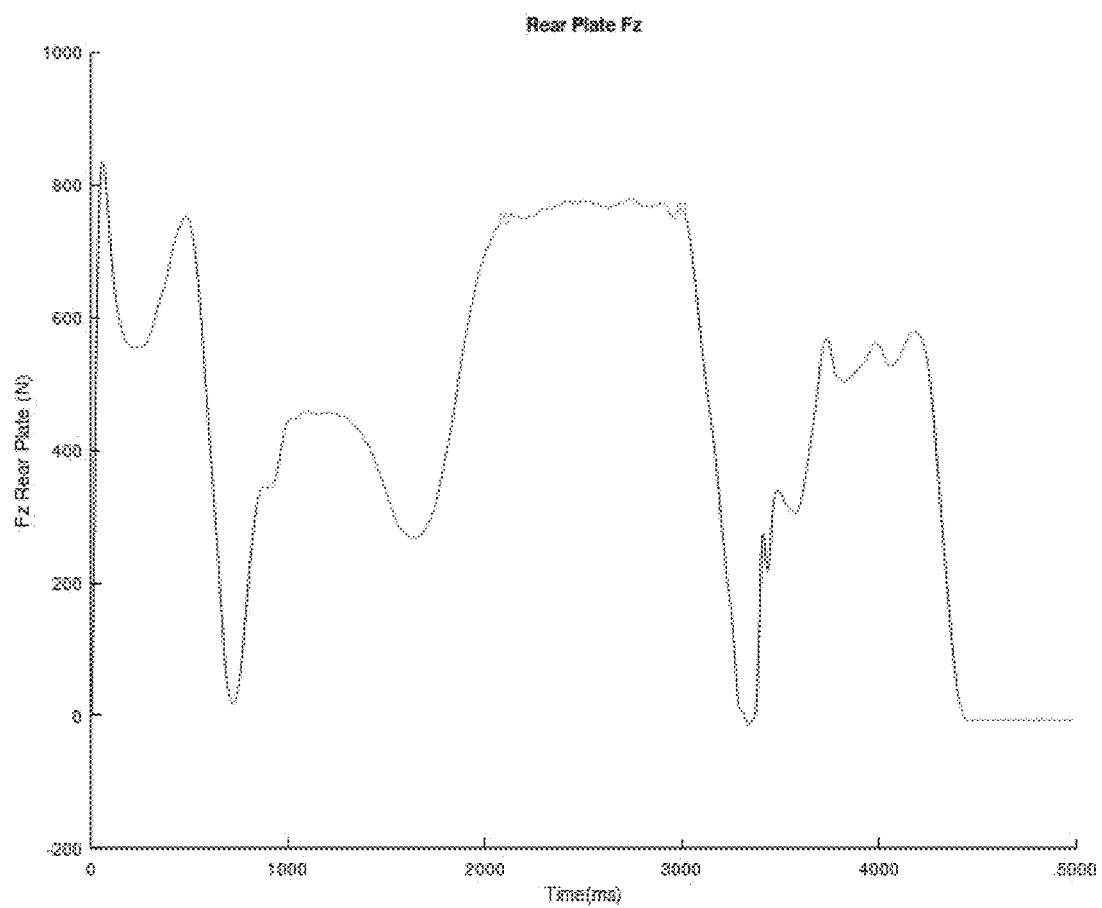
FIG. 13 is a graph illustrating a z-axis force curve generated during a baseball swing for a rear force plate from which the load quality is determined, according to an embodiment of the invention.
Figure 14:
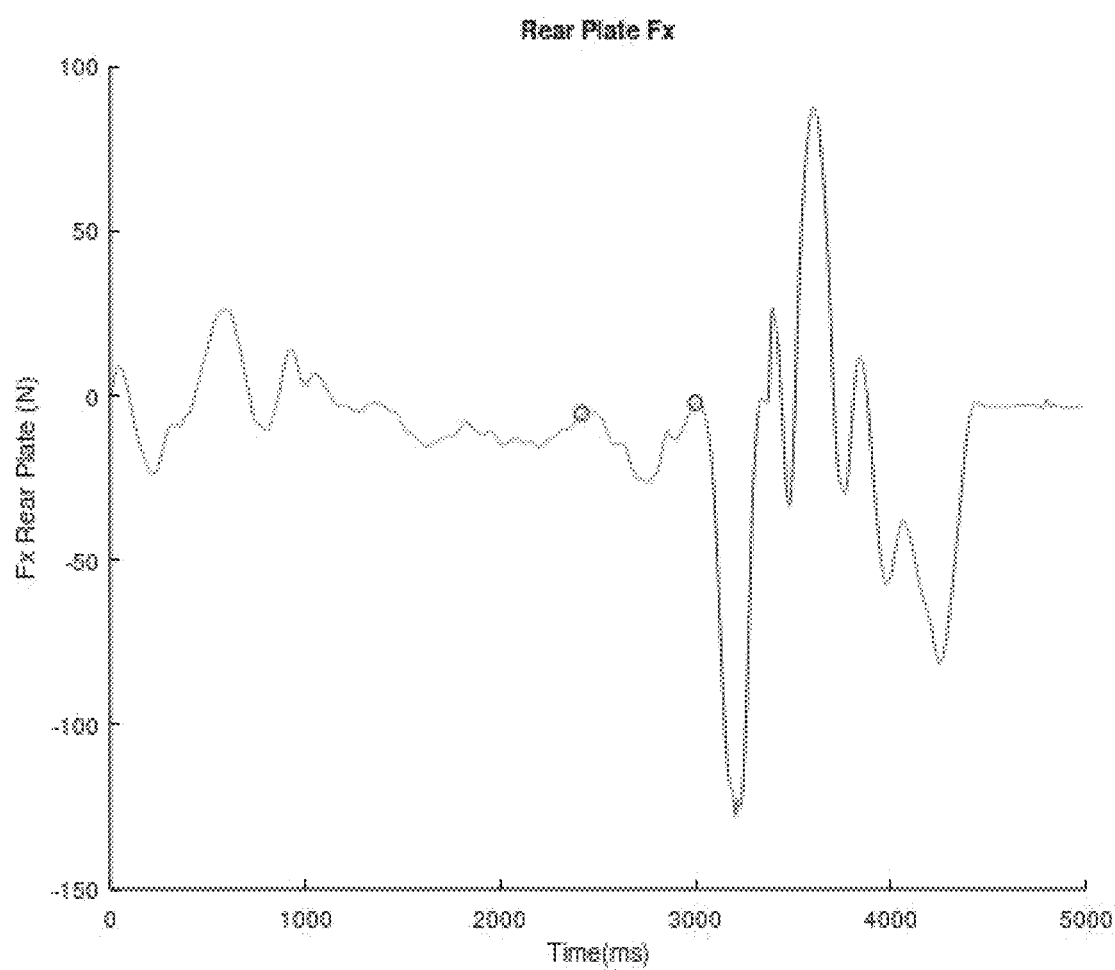
FIG. 14 is a graph illustrating an x-axis force curve generated during a baseball swing for a rear force plate from which the load variability is determined, according to an embodiment of the invention.
Figure 15:
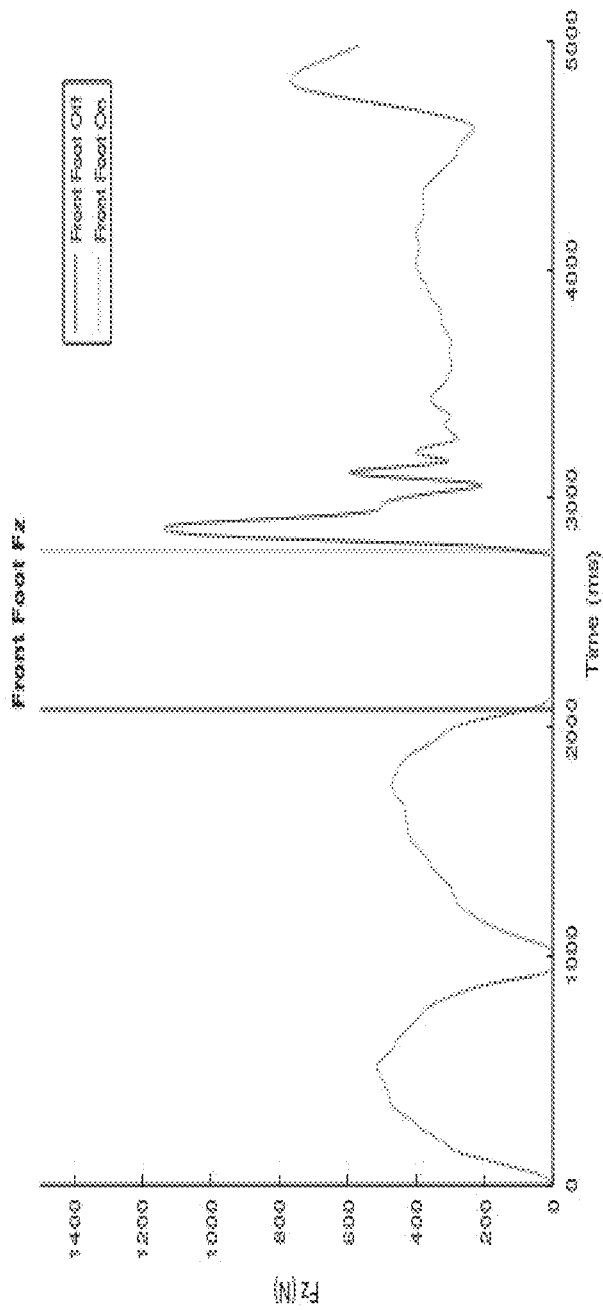
FIG. 15 is a graph illustrating a z-axis force curve generated during a baseball swing for the front foot of the baseball player, according to an embodiment of the invention.

Turning to FIGS. 13 and 14, the data processing device 14 additionally may be programmed to determine the load quality and load variability for the baseball player. First of all, using the rear force plate $F_z$ plot in FIG. 13, the standard deviation is taken between the beginning and end of the load phase on the back side. This standard deviation is subtracted to 100 to create a load quality z score. The closer to 100, the more consistent the load. For the exemplary data depicted in FIG. 13, the standard deviation is 6.24. As such, the load quality is determined by the data processing device 14 as follows:

$$\text{Load Quality } Z\text{: } 100-6.24=93.76 \tag{8}$$

Secondly, using the rear force plate $F_x$ plot in FIG. 14, the same process can be completed using these points on the $F_x$ rear force plate plot to find a load quality x score. For the exemplary data depicted in FIG. 14, the standard deviation is 7.38. As such, the load variability is determined by the data processing device 14 as follows:

$$\text{Load Variability } X\text{: } 100-7.38=92.62 \tag{9}$$

The data processing device 14 may calculate the load quality as the average between Load Quality Z and Load Variability X as follows:

$$\text{Load Quality}=(93.76+92.62)/2=93.19 \tag{10}$$

Figure 16:
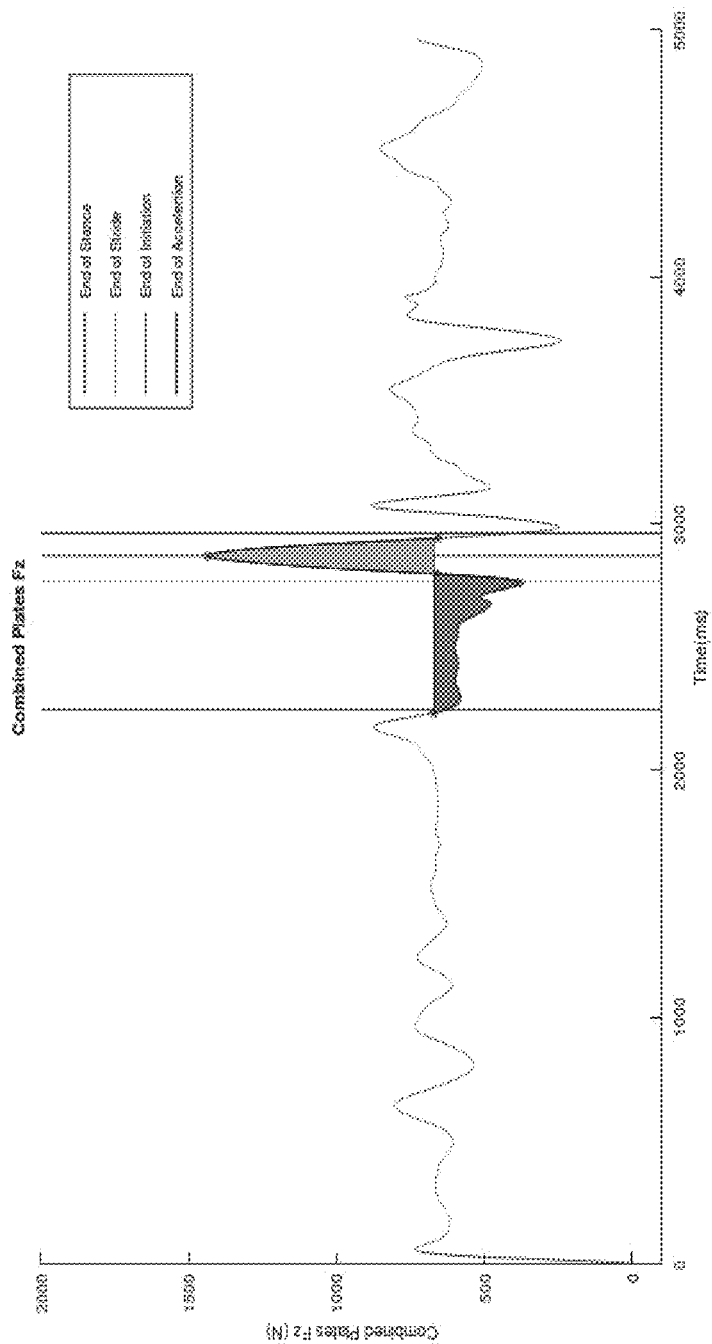
FIG. 16 is a graph illustrating a z-axis force curve generated during a baseball swing for the combined front and rear force plates from which the baseball swing phases are autodetected, according to an embodiment of the invention.

In the illustrative embodiment, the data processing device 14 additionally may be programmed to determine baseball swing phases for the baseball player. For example, the data processing device 14 may be programmed to determine the following baseball swing phases for the baseball player: (i) stance (i.e., ready position to lead leg off), (ii) stride (i.e., lead leg off to BW>≈10%), (iii) coiling, (iv) swing initiation (i.e., lead leg>≈10% to peak force), (v) swing acceleration (i.e., peak force to contact), and (vi) follow through. As part of the determination of the baseball swing phases, the data processing device 14 may be programmed to determine the on and off positions of the front foot (refer to FIG. 15). In addition, as shown in FIG. 16, the data processing device 14 may be programmed to autodetect the baseball swing phases. In addition to performing autodetection of swing phases for the baseball swing, the data processing device 14 may be further programmed to perform phase autodetection for a golf swing, a countermovement jump, and a squat jump. The data processing device 14 also may be programmed to determine the right or left handedness of a swing (e.g., a baseball swing or golf swing), specific movements within a swing (e.g., front foot on/off, propulsion, braking, follow through), and shifts in bodyweight during a swing.

In the illustrative embodiment, the data processing device 14 of the swing analysis system 100 is programmed to output the swing performance metrics described above for the front force plate of the force measurement assembly 22, the rear force plate of the force measurement assembly 22, or both the front and rear force plates of the force measurement assembly 22. Also, in the illustrative embodiment, the data processing device 14 may be programmed to compute impulses, peak forces and/or torques, a rate of force development, and other performance metrics for the front force plate and/or rear force plate of the force measurement assembly 22. In addition, the swing performance metrics described above may be determined using one or two force plates of the swing analysis system 100 (i.e., either the front force plate or the rear force plate, or both the front and rear force plates).

Figure 17:
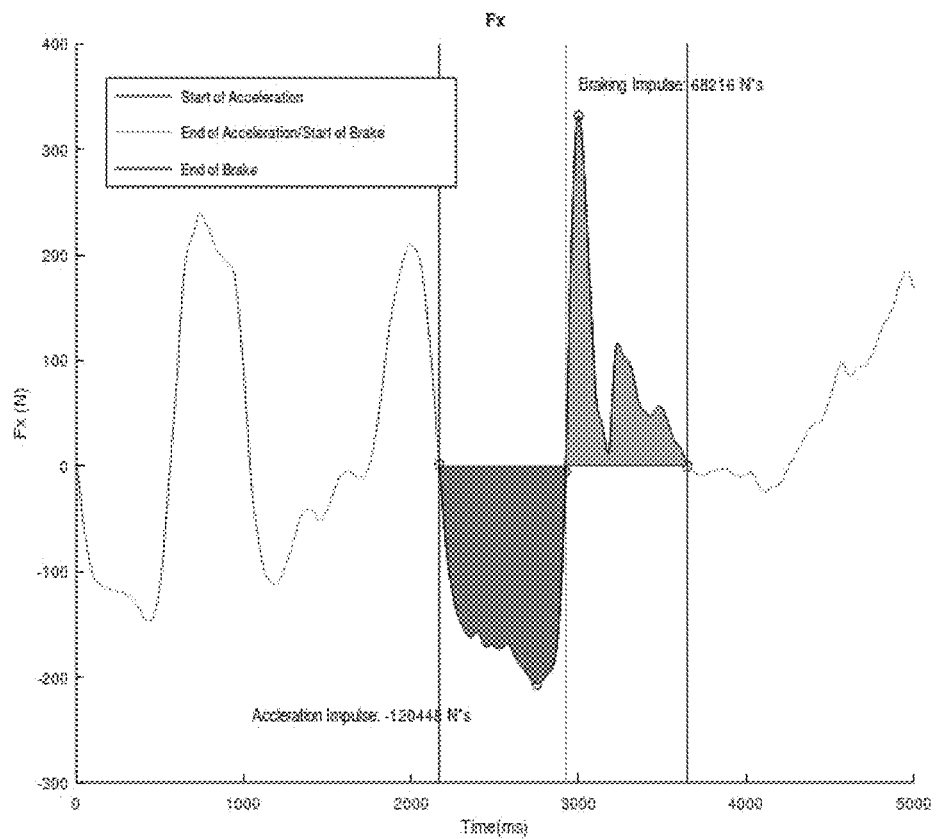
FIG. 17 is a graph illustrating an x-axis force curve generated during a baseball swing from which the acceleration impulse and the deceleration impulse are determined, according to an embodiment of the invention.

In the illustrative embodiment, the data processing device 14 further may be programmed to generate a baseball swing report with various swing performance metrics determined from the force plate output data. For example, as shown in FIG. 17, the data processing device 14 may be programmed to determine the acceleration impulse for the baseball player, and to include the acceleration impulse in the baseball swing report. The acceleration impulse is indicative of the change in velocity of the baseball player as he or she accelerates toward the pitcher. The acceleration impulse is measured in the x-axis during the stride phase when the baseball player pushes himself or herself forward. This acceleration impulse results in the baseball player moving toward the pitcher with a velocity proportional to the impulse, a higher impulse means the athlete has created more kinetic energy toward the pitcher. As another example, referring again to FIG. 17, the data processing device 14 may be programmed to determine the deceleration or braking impulse for the baseball player, and to include the deceleration or braking impulse in the baseball swing report. The deceleration impulse is indicative of the amount of energy created to stop the forward velocity of the hitter (i.e., in other words, the braking energy of the hitter). Measured in the x-axis, the deceleration impulse is the amount of energy created to stop the forward velocity of the hitter. A higher value of the deceleration impulse means the hitter has a better braking ability.

Figure 18:
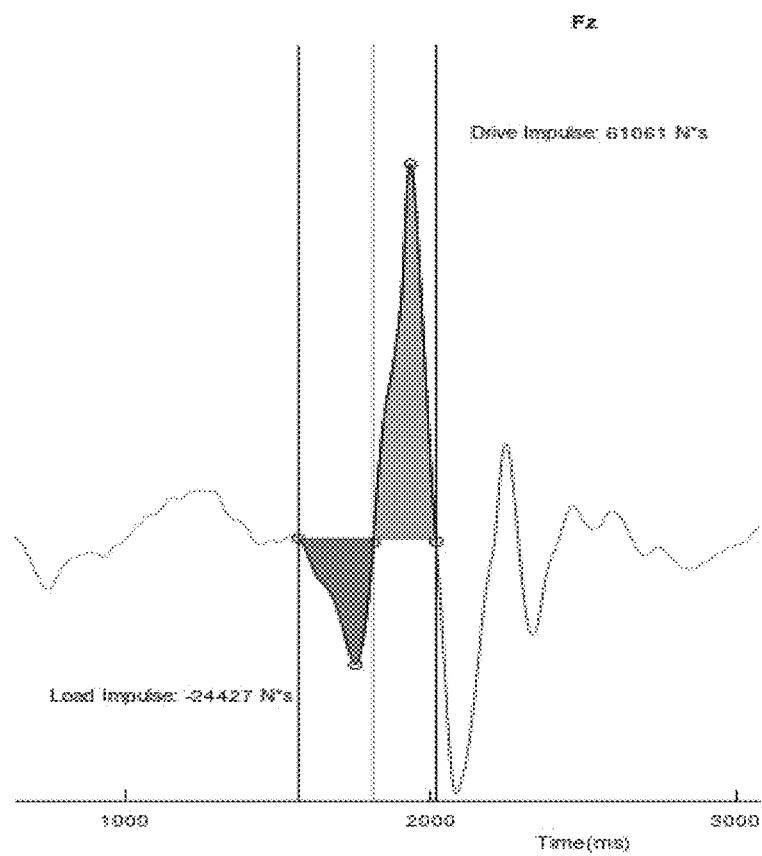
FIG. 18 is a graph illustrating a z-axis force curve generated during a baseball swing from which the load impulse and the drive impulse are determined, according to an embodiment of the invention.

As yet another example, turning to FIG. 18, the data processing device 14 also may be programmed to determine the $F_z$ load impulse for the baseball player, and to include the $F_z$ load impulse in the baseball swing report. The load impulse is indicative of the energy created by the "fall" of the hitter toward the ground. When the hitter sinks toward the ground, he or she creates energy due to the force of gravity. The load impulse is the amount of energy that he or she creates in this phase. The load impulse is calculated by the impulse when the force in the vertical direction becomes less than the body weight of the hitter. The energy that is created as the hitter falls is quantified by the load impulse. As still another example, with reference again to FIG. 18, the data processing device 14 may be programmed to determine the $F_z$ drive impulse for the baseball player, and to include the $F_z$ drive impulse in the baseball swing report. The drive impulse is indicative of the amount of vertical thrust created by the hitter. In long drive golf competitions, athletes typically create such a high drive impulse that they finish the swing in the air. When an athlete jumps off the ground, he or she creates a vertical impulse proportional to his or her jump height. A higher impulse results in a higher jump height and more energy created. In a countermovement jump, the athlete takes advantage of the load and drive impulse to jump higher. The drive impulse is measured as the impulse in the vertical $F_z$ direction where the force generated is above bodyweight. The energy that is created as the hitter pushes into the ground to create vertical thrust is quantified by the drive impulse.

Figure 19:
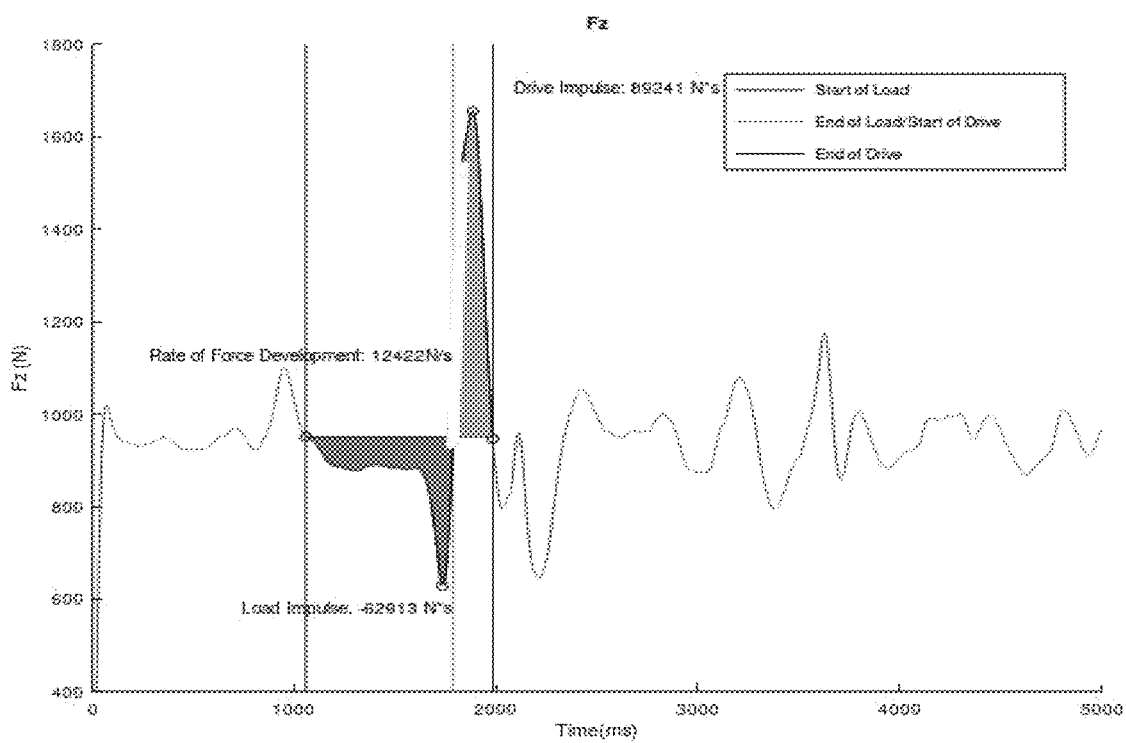
FIG. 19 is another graph illustrating a z-axis force curve generated during a baseball swing from which the load impulse, the drive impulse, and the rate of force development along the z-axis are determined, according to an embodiment of the invention.
Figure 20:
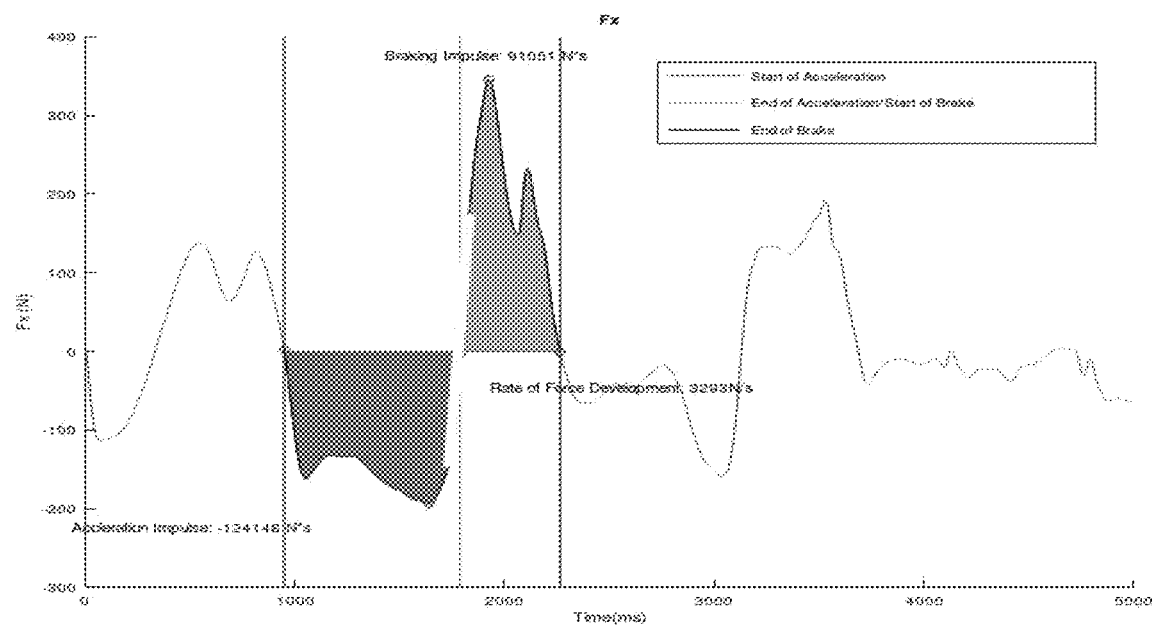
FIG. 20 is another graph illustrating an x-axis force curve generated during a baseball swing from which the acceleration impulse, the deceleration impulse, and the rate of force development along the x-axis are determined, according to an embodiment of the invention.

As yet another example, turning to FIG. 19, the data processing device 14 additionally may be programmed to determine the rate of force development along the z-axis for the baseball player, and to include the rate of force development along the z-axis in the baseball swing report. In addition, as shown in FIG. 20, the data processing device 14 may be programmed to determine the rate of force development along the x-axis for the baseball player, and to include the rate of force development along the x-axis in the baseball swing report. An exemplary baseball swing report may include the following swing performance metrics:
  Max $F_z$ Drive Force: 1655 N
  Max $F_z$ Load Force: 629 N
  Max $F_x$ Acceleration Force: −194 N
  Max $F_x$ Braking Force: 346 N
  Rate of Force Development x-axis: 3293 N/s
  Rate of Force Development z-axis: 12422 N/s
  Load Quality: 91.26

Figure 21:
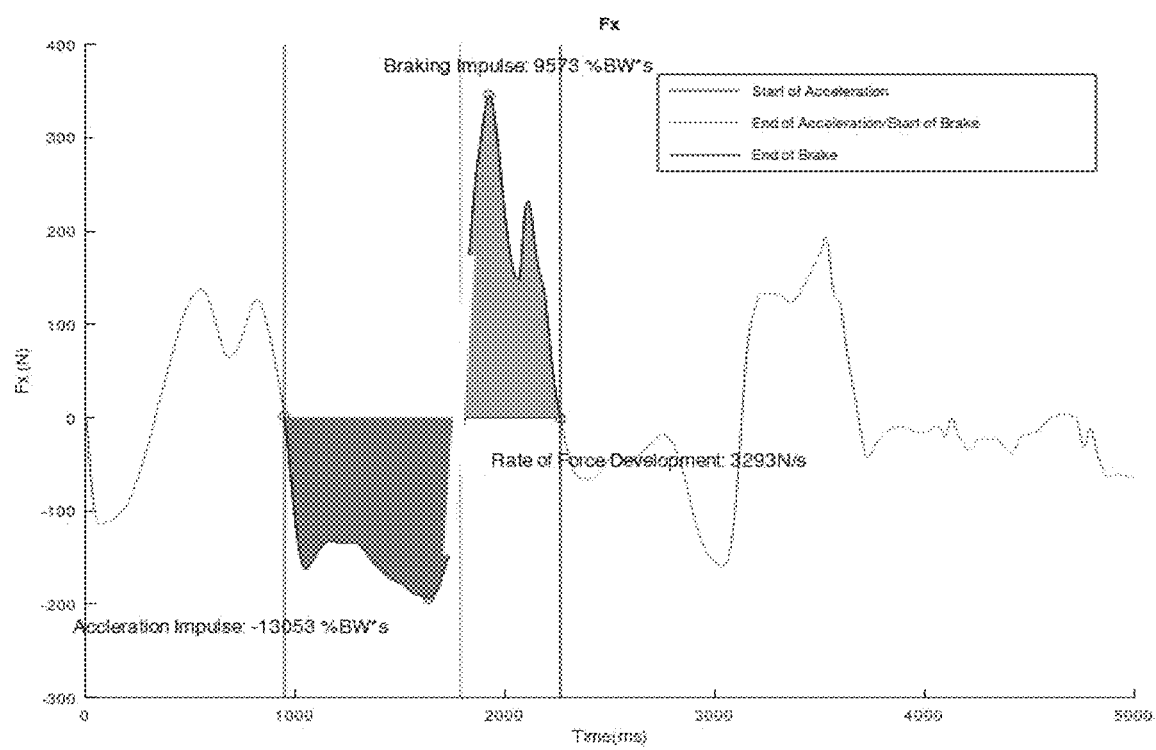
FIG. 21 is yet another graph illustrating an x-axis force curve generated during a baseball swing from which the acceleration impulse, the deceleration impulse, and the rate of force development along the x-axis are determined, according to an embodiment of the invention.
Figure 22:
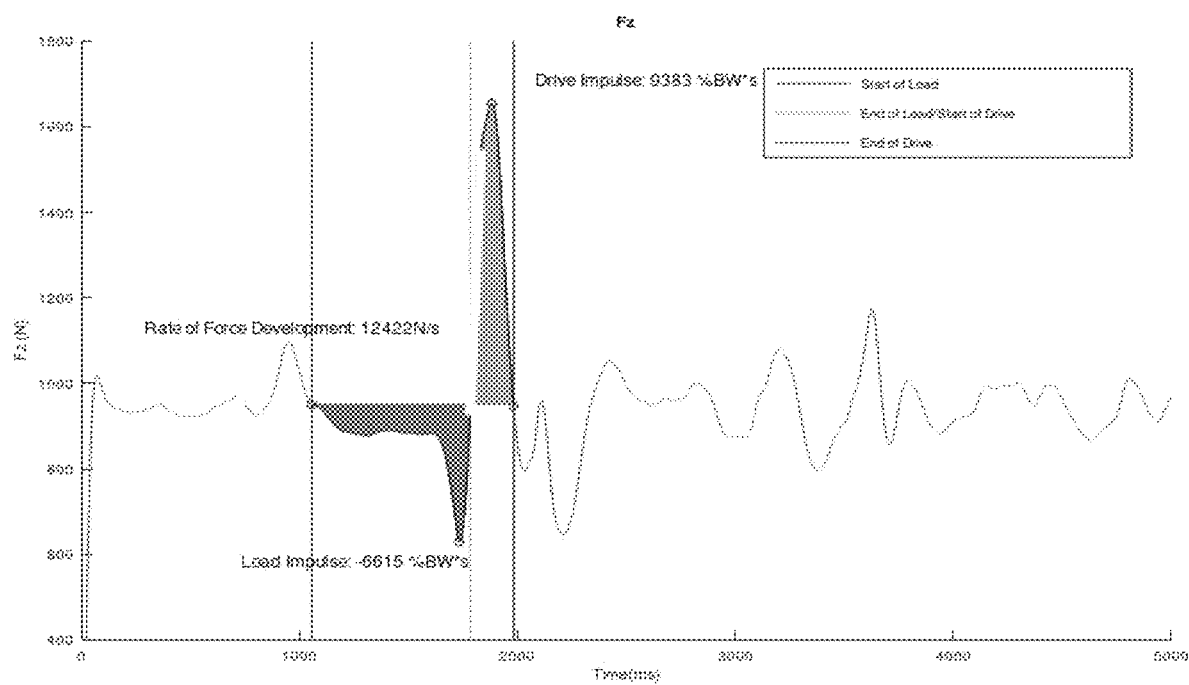
FIG. 22 is yet another graph illustrating a z-axis force curve generated during a baseball swing from which the load impulse, the drive impulse, and the rate of force development along the z-axis are determined, according to an embodiment of the invention.

As still another example, turning to FIG. 21, the data processing device 14 also may be programmed to determine braking impulse and the acceleration impulse for the baseball player, and to include the braking impulse and the acceleration impulse in the baseball swing report. In addition, as shown in FIG. 22, the data processing device 14 may be programmed to determine the drive impulse and the load impulse for the baseball player, and to include the drive impulse and the load impulse in the baseball swing report. An exemplary baseball swing report may include the following swing performance metrics (where "% BW" is percent of body weight):
  Max $F_z$ Drive Force: 174% BW (N)
  Max $F_z$ Load Force: 66% BW (N)
  Max $F_x$ Acceleration Force: 20% BW (N)
  Max $F_x$ Deceleration Force: 36% BW (N)
  Drive Impulse: 9383% BW*s (N*s)
  Load Impulse: 6615% BW*s (N*s)
  Acceleration Impulse: 13503% BW*s (N*s)
  Braking Impulse: 9573% BW*s (N*s)

In one or more other illustrative embodiments, the baseball swing report may include any combination of the following swing performance metrics: (i) momentum impulse, (ii) load, (iii) drive, (iv) acceleration, (v) deceleration, (vi) load variability, (vii) rate of force development, and (viii) peak force.

Figure 23:
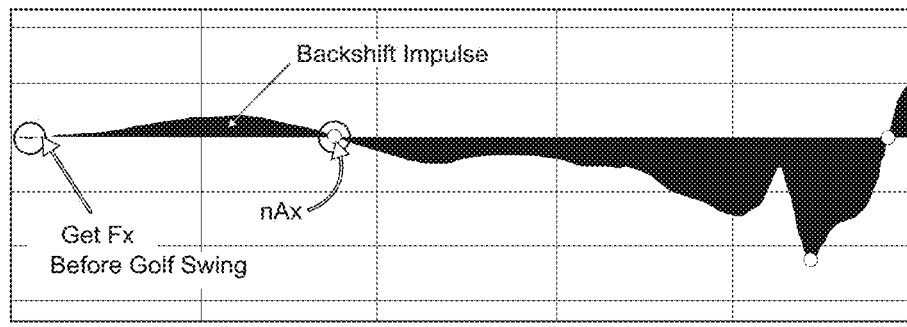
FIG. 23 is yet another graph illustrating a x-axis force curve generated during a golf swing from which the golf backshift impulse is determined, according to an embodiment of the invention.

As yet another example, turning to FIG. 23, the data processing device 14 also may be programmed to determine the backshift impulse of a golf swing for a golfer. The golf backshift impulse is calculated as the integral of the $F_x$ force curve before the acceleration phase by the data processing device 14. More specifically, the data processing device 14 calculates the area of the $F_x$ force curve when the force is above zero before nAx (see FIG. 23). This is when the golfer initially shifts back before putting force towards the ball in the acceleration phase. The value nAx is proximate to the last moment before the transition from the backswing to the downswing of the golfer.

Figure 24:
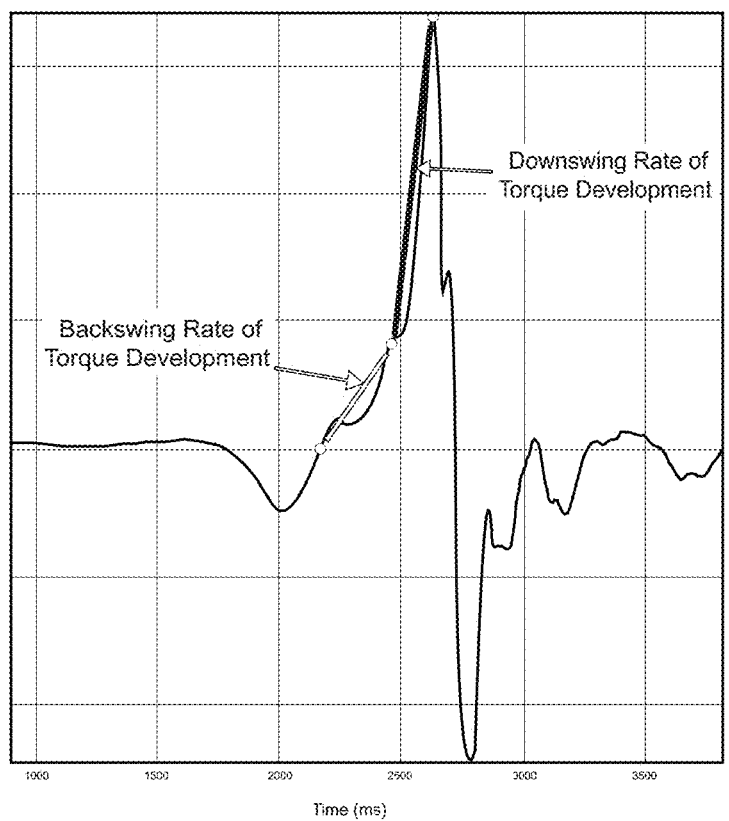
FIG. 24 is a graph illustrating a moment about the z-axis generated during a golf swing from which the golf downswing rate of torque development is determined, according to an embodiment of the invention.

As still another example, turning to FIG. 24, the data processing device 14 also may be programmed to determine the golf backswing rate of torque development of a golf swing for a golfer. The golf backswing rate of torque development is calculated by the data processing device 14 as the slope of the $M_z$ swing torque curve from the instance $M_z$ becomes positive to nAz (see FIG. 24). This is when the golfer is in the backswing and nAz is around the last moment before the transition from backswing to downswing. The data processing device 14 may calculate the golf backswing rate of torque development (RTD) as follows:

$$\text{Backswing RTD}=(Mz(nBmz)-Mz(nAmz))-(nBmz-nAmz) \quad (11)$$

$$nAmz=\text{first moment } M_z \text{ is above 0 in the backswing} \quad (12)$$

$$nBmz=(nAz+nBz)/2 \quad (13)$$

In equation (13) above, nBz is the index of min Fz load.

As yet another example, turning to FIG. 24, the data processing device 14 also may be programmed to determine the golf downswing rate of torque development of a golf swing for a golfer. The golf downswing rate of torque development is calculated by the data processing device 14 as the slope of the $M_z$ swing torque curve from nAz to peak $M_z$ (see FIG. 24). This is when the golfer is in the downswing and peak $M_z$ is around ball contact. The data processing device 14 may calculate the golf downswing rate of torque development (RTD) as follows:

$$\text{Downswing RTD}=(Mz(nCmz)-Mz(nBmz))-(nCmz-nBmz) \quad (14)$$

$$nBmz=(nAz+nBz)/2; \quad (15)$$

$$nCmz=\max(Mz); \quad (16)$$

In equation (15) above, nBz is the index of min Fz load.

As still another example, the data processing device 14 also may be programmed to determine the time to contact during a baseball swing. The data processing device 14 determines the time to contact during the baseball swing by subtracting a first time instance when a foot of the user is put back down on the ground at the end of a stride phase from an estimated time to ball contact. The data processing device 14 may calculate the time to contact during a baseball swing as follows:

$$\text{TimeToContact} = \text{TimeBallContact} - \text{TimeFrontFootOn} \quad (17)$$

In equation (17) above, "TimeFrontFootOn" is the event point (i.e., time location) of when the foot of the baseball player is put back down on the ground, marking the end of the stride phase.

In a further illustrative embodiment of the swing analysis system 100, the system 100 uses a combination of the force measurement assembly 22 (e.g., a force plate) and a motion capture system that obtains images of a user swinging an object (e.g., a golf club or baseball bat) via computer vision algorithms by triangulating positions with multiple RGB (red green blue) video cameras. The body key point positions (joints) are detected, and the center of mass (COM) of the body is determined based on the body key point positions. The location of the force plate relative to the body is also recognized, such that the moment about the center of mass is able to be determined.

In this further illustrative embodiment, the center of mass of the body is obtained using computer vision and processing algorithms. First, the body center of mass (COM) and the location of the force plate relative to the COM is obtained. Then, the moment about the center of mass is calculated using COM position data and the global ground reaction forces from the force plate. Also, because computer vision results are obtained, enhanced phase detection and kinematic processing also is able to be performed. In this further illustrative embodiment, phase detection of the following is additionally performed: (i) start of the swing (swing initiation), (ii) top of backswing, and (iii) ball contact.

In this further illustrative embodiment, an input of 2-4 RGB video cameras may be used. Also, the swing analysis system 100 uses a computer vision algorithm to obtain 17 or more keypoint locations on the human subject during a swinging motion. The keypoint locations for each frame create a time-series file containing the locations of each keypoint in three-dimensional (3D) space. These keypoints are then processed to output the location of the center of mass in 3D space. For example, the three-dimensional (3D) pose estimation system described in pending U.S. patent application Ser. No. 16/826,200 may be used to determine the keypoint locations, the entire disclosure of which is incorporated herein by reference.

In this further illustrative embodiment, the force measurement assembly 22 is visible to the camera system. The front and rear force plates 26, 28 are detected by the computer vision algorithm and the 3D coordinates of the force plates 26, 28 are input into the 3D coordinate system, such that the human pose and the force plates 26, 28 are in the same 3D reconstruction. Using the 3D data of human and force plates 26, 28, the value of the moment (torque) about the center of mass of the human subject is calculated by the data processing device 14 for each frame/sample. This information is used by swing coaches to optimize the moment and create a higher velocity clubhead speed.

Additionally, in this further illustrative embodiment, the keypoint time series information may be used by the data processing device 14 to do an algorithmic analysis of the kinematic data of the human subject. The data processing device 14 may calculate the angular position, velocity, and acceleration of each of the body segments for each frame.

It is readily apparent that the swing analysis system 100 described above offers numerous advantages and benefits for training athletes. First, the swing analysis system 100 is capable of determining swing performance metrics from output data of a force measurement assembly. Moreover, the swing analysis system 100 is capable of autodetecting one or more swing phases of a user. Furthermore, the swing analysis system 100 is capable of generating a swing analysis report that includes one or more swing performance metrics.

While reference is made throughout this disclosure to, for example, "an illustrative embodiment", "one embodiment", or a "further embodiment", it is to be understood that some or all aspects of these various embodiments may be combined with one another as part of an overall embodiment of the invention. That is, any of the features or attributes of the aforedescribed embodiments may be used in combination with any of the other features and attributes of the aforedescribed embodiments as desired.

Although the invention has been shown and described with respect to a certain embodiment or embodiments, it is apparent that this invention can be embodied in many different forms and that many other modifications and variations are possible without departing from the spirit and scope of this invention. For example, while the embodiments presented above focus on the analysis of a baseball swing, it is to be understood that the swing analysis principles described above may be applied to the swing analysis of any implement or object swung by a user, such as a baseball bat, cricket bat, golf club, tennis racket, squash racket, etc.

Moreover, while exemplary embodiments have been described herein, one of ordinary skill in the art will readily appreciate that the exemplary embodiments set forth above are merely illustrative in nature and should not be construed as to limit the claims in any manner. Rather, the scope of the invention is defined only by the appended claims and their equivalents, and not, by the preceding description.

The invention claimed is:

1. A swing analysis system, comprising:
   a force measurement assembly configured to receive a user, the force measurement assembly including:
   a top surface for receiving at least one portion of the body of the user; and
   at least one force transducer, the at least one force transducer configured to sense one or more measured quantities and output one or more signals that are representative of forces and/or moments being applied to the top surface of the force measurement assembly by the user; and
   a data processing device operatively coupled to the force measurement assembly, the data processing device configured to receive the one or more signals that are representative of the forces and/or moments being applied to the top surface of the force measurement assembly by the user, and to convert the one or more signals into output forces and/or moments, the data processing device further configured to determine one or more swing performance metrics for the user using the output forces and/or moments from the force measurement assembly;
   wherein the output forces and/or moments determined by the data processing device include shear force ($F_x$) values and vertical force ($F_z$) values;

wherein the one or more swing performance metrics determined by the data processing device comprise a rate of force development along the x-axis and a rate of force development along the z-axis; and wherein the data processing device determines the rate of force development along the x-axis from an $F_x$ force curve generated from the shear force values, and the data processing device determines the rate of force development along the z-axis from an $F_z$ force curve generated from the vertical force values.

2. The swing analysis system according to claim 1,
wherein the one or more swing performance metrics determined by the data processing device further comprise a peak load force and a peak drive force; and
wherein the data processing device determines the peak load force from a load phase of the $F_z$ force curve generated from the vertical force values, and the data processing device determines the peak drive force from a drive phase of the $F_z$ force curve.

3. The swing analysis system according to claim 1,
wherein the one or more swing performance metrics determined by the data processing device further comprise a peak acceleration force and a peak braking force; and
wherein the data processing device determines the peak acceleration force from an acceleration phase of the $F_x$ force curve generated from the shear force values, and the data processing device determines the peak braking force from a braking phase of the $F_x$ force curve.

4. The swing analysis system according to claim 1,
wherein the one or more swing performance metrics determined by the data processing device further comprise an impulse efficiency ratio and a force efficiency ratio; and
wherein the data processing device determines the impulse efficiency ratio as a function of a braking impulse and an acceleration impulse from the $F_x$ force curve generated from the shear force values, and the data processing device determines the force efficiency ratio as a function of a braking force and an acceleration force from the $F_x$ force curve.

5. The swing analysis system according to claim 1, wherein the output forces and/or moments determined by the data processing device further include swing torque values generated during a swing of the user;
wherein the one or more swing performance metrics determined by the data processing device further comprise a peak rotational acceleration torque and a peak rotational braking torque; and
wherein the data processing device determines the peak rotational acceleration torque from a rotational acceleration phase of a swing torque curve generated from the swing torque values, and the data processing device determines the peak rotational braking torque from a rotational braking phase of the swing torque curve.

6. The swing analysis system according to claim 1,
wherein the one or more swing performance metrics determined by the data processing device further comprise a vertical to horizontal brake ratio; and
wherein the data processing device determines the vertical to horizontal brake ratio by computing a ratio of a peak braking force from a braking phase of the $F_x$ force curve generated from the shear force values to a peak driving force from a driving phase of the $F_z$ force curve generated from the vertical force values.

7. The swing analysis system according to claim 1,
wherein the one or more swing performance metrics determined by the data processing device further comprise a load quality of a load phase of the $F_z$ force curve generated from the vertical force values; and
wherein the data processing device determines the load quality as a function of a standard deviation taken from a beginning to an end of the load phase of the $F_z$ force curve.

8. The swing analysis system according to claim 1,
wherein the one or more swing performance metrics determined by the data processing device further comprise a load variability along a portion of the $F_x$ force curve generated from the shear force values; and
wherein the data processing device determines the load variability as a function of a standard deviation taken along the portion of the $F_x$ force curve.

9. The swing analysis system according to claim 1, wherein the one or more swing performance metrics determined by the data processing device further comprise one or more of the following swing phases for a baseball player: (i) stance, (ii) stride, (iii) coiling, (iv) swing initiation, (v) swing acceleration, and (vi) follow through; and
wherein at least one of the swing phases for the baseball player is autodetected by the data processing device of the swing analysis system.

10. The swing analysis system according to claim 1,
wherein the one or more swing performance metrics determined by the data processing device further comprise an acceleration impulse and a deceleration impulse; and
wherein the data processing device determines the acceleration impulse from an acceleration phase of the $F_x$ force curve generated from the shear force values, and the data processing device determines the deceleration impulse from a braking phase of the $F_x$ force curve.

11. The swing analysis system according to claim 1,
wherein the one or more swing performance metrics determined by the data processing device further comprise a load impulse and a drive impulse; and
wherein the data processing device determines the load impulse from a load phase of the $F_z$ force curve generated from the vertical force values, and the data processing device determines the drive impulse from a drive phase of the $F_z$ force curve.

12. The swing analysis system according to claim 1, wherein one or more additional swing performance metrics determined by the data processing device are selected from the group consisting of: (i) a maximum $F_z$ drive force, (ii) a maximum $F_z$ load force, (iii) a maximum $F_x$ acceleration force, (iv) a maximum $F_x$ braking or deceleration force, (v) a rate of force development along the x-axis, (vi) a rate of force development along the z-axis, (vii) load quality, (viii) load variability, (ix) a drive impulse, (x) a load impulse, (xi) an acceleration impulse, (xii) a braking impulse, and (xiii) combinations thereof.

13. The swing analysis system according to claim 1, wherein the force measurement assembly is in the form of an instrumented treadmill, force plate, or a balance plate.

14. The swing analysis system according to claim 1, wherein the force measurement assembly comprises a front force plate and a rear force plate.

15. The swing analysis system according to claim 1, wherein one or more additional swing performance metrics determined by the data processing device comprise one or more of the following swing phases for a golfer: (i) stance, (ii) stride, (iii) coiling, (iv) swing initiation, (v) swing acceleration, and (vi) follow through; and wherein at least one of the swing phases for the golfer is autodetected by the data processing device of the swing analysis system.

16. The swing analysis system according to claim 1, wherein the one or more swing performance metrics determined by the data processing device further comprise a backshift impulse of a golf swing; and
wherein the data processing device determines the backshift impulse of the golf swing by determining an area under the $F_x$ force curve generated from the shear force values, the area under the $F_x$ force curve being determined for a portion of the $F_x$ force curve prior to a transition point between a golf backswing to a golf downswing when the shear force values are greater than zero.

17. The swing analysis system according to claim 1, wherein the output forces and/or moments determined by the data processing device further include swing torque ($M_z$) values generated during a golf swing of the user;
wherein the one or more swing performance metrics determined by the data processing device further comprise a golf backswing rate of torque development during the golf swing; and
wherein the data processing device determines the golf backswing rate of torque development by calculating a slope of an $M_z$ swing torque curve generated from the swing torque values, the slope of the $M_z$ swing torque curve being determined between a first point where the swing torque values of the $M_z$ swing torque curve become positive and a second point proximate to a transition between a golf backswing to a golf downswing.

18. The swing analysis system according to claim 1, wherein the output forces and/or moments determined by the data processing device further include swing torque ($M_z$) values generated during a golf swing of the user;
wherein the one or more swing performance metrics determined by the data processing device further comprise a golf downswing rate of torque development during the golf swing; and
wherein the data processing device determines the golf downswing rate of torque development by calculating a slope of an $M_z$ swing torque curve generated from the swing torque values, the slope of the $M_z$ swing torque curve being determined between a first point and a second point, the first point being the transition point between a golf backswing to a golf downswing, and the second point being a maximum swing torque value on the $M_z$ swing torque curve.

19. The swing analysis system according to claim 1, wherein the one or more swing performance metrics determined by the data processing device further comprise a time to contact during a baseball swing, the time to contact being determined by subtracting a first time instance when a foot of the user is put back down on the ground at the end of a stride phase from an estimated time to ball contact.

20. A swing analysis system, comprising:
a force measurement assembly configured to receive a user, the force measurement assembly including:
a top surface for receiving at least one portion of the body of the user; and
at least one force transducer, the at least one force transducer configured to sense one or more measured quantities and output one or more signals that are representative of forces and/or moments being applied to the top surface of the force measurement assembly by the user; and
a data processing device operatively coupled to the force measurement assembly, the data processing device configured to receive the one or more signals that are representative of the forces and/or moments being applied to the top surface of the force measurement assembly by the user, and to convert the one or more signals into output forces and/or moments, the data processing device further configured to determine one or more swing performance metrics for the user using the output forces and/or moments from the force measurement assembly;
wherein the output forces and/or moments determined by the data processing device include shear force ($F_x$) values;
wherein the one or more swing performance metrics determined by the data processing device comprise an acceleration impulse and a deceleration impulse; and
wherein the data processing device determines the acceleration impulse from an acceleration phase of an $F_x$ force curve generated from the shear force values, and the data processing device determines the deceleration impulse from a braking phase of the $F_x$ force curve.

21. A swing analysis system, comprising:
a force measurement assembly configured to receive a user, the force measurement assembly including:
a top surface for receiving at least one portion of the body of the user; and
at least one force transducer, the at least one force transducer configured to sense one or more measured quantities and output one or more signals that are representative of forces and/or moments being applied to the top surface of the force measurement assembly by the user; and
a data processing device operatively coupled to the force measurement assembly, the data processing device configured to receive the one or more signals that are representative of the forces and/or moments being applied to the top surface of the force measurement assembly by the user, and to convert the one or more signals into output forces and/or moments, the data processing device further configured to determine one or more swing performance metrics for the user using the output forces and/or moments from the force measurement assembly;
wherein the output forces and/or moments determined by the data processing device include vertical force ($F_z$) values;
wherein the one or more swing performance metrics determined by the data processing device comprise a load impulse and a drive impulse; and
wherein the data processing device determines the load impulse from a load phase of an $F_z$ force curve generated from the vertical force values, and the data processing device determines the drive impulse from a drive phase of the $F_z$ force curve.

* * * * *